US012263971B2

(12) United States Patent
Dishion et al.

(10) Patent No.: US 12,263,971 B2
(45) Date of Patent: Apr. 1, 2025

(54) SYSTEM AND METHOD FOR A PRODUCT PACKAGING ASSEMBLY

(71) Applicant: COASTAL COUNTING & INDUSTRIAL SCALE COMPANY, INC., Santa Paula, CA (US)

(72) Inventors: John Dishion, Santa Paula, CA (US); Jason Satnick, Santa Paula, CA (US); Christopher Dawley, Santa Paula, CA (US); Roberto Santos, Santa Paula, CA (US); Hasala Senevirathne, Santa Paula, CA (US)

(73) Assignee: COASTAL COUNTING & INDUSTRIAL SCALE COMPANY, INC., Santa Paula, CA (US)

( * ) Notice: Subject to any disclaimer, the term of this patent is extended or adjusted under 35 U.S.C. 154(b) by 0 days.

(21) Appl. No.: 18/586,343

(22) Filed: Feb. 23, 2024

(65) Prior Publication Data
US 2024/0286778 A1    Aug. 29, 2024

Related U.S. Application Data

(60) Provisional application No. 63/447,854, filed on Feb. 23, 2023.

(51) Int. Cl.
*B65B 1/06* (2006.01)
*B65B 1/08* (2006.01)
(Continued)

(52) U.S. Cl.
CPC .............. *B65B 1/32* (2013.01); *B65B 1/06* (2013.01); *B65B 1/08* (2013.01); *B65B 1/46* (2013.01);
(Continued)

(58) Field of Classification Search
CPC .... B65B 1/06; B65B 1/08; B65B 1/30; B65B 1/32; B65B 1/46; B65B 37/18; G01G 13/247; G01G 19/393
(Continued)

(56) References Cited

U.S. PATENT DOCUMENTS

| 4,534,429 A * | 8/1985 | Konishi | ............... G01G 19/393 177/98 |
| 4,678,047 A | 7/1987 | Kataoka | |

(Continued)

FOREIGN PATENT DOCUMENTS

| CN | 208994022 U | 6/2019 |
| CN | 215852118 U | 2/2022 |

(Continued)

OTHER PUBLICATIONS

"International Search Report and Written Opinion of the International Searching Authority," issued in connection with Int'l Appl. No. PCT/US2024/017172, dated Jun. 5, 2024 (12 pages).

*Primary Examiner* — Stephen F. Gerrity
(74) *Attorney, Agent, or Firm* — Holland & Hart LLP

(57) ABSTRACT

The disclosed technology includes a method of packaging a product using a packaging system. The packaging system includes at least one weigh bucket, at least one sorting apparatus, at least one reject funnel, at least one accept funnel, and at least one memory bucket. The method includes loading the product into the packaging system, weighing the product with the at least one weigh bucket, determining that the product meets or exceeds a predetermined weight amount, dropping the product from the at least one weigh bucket into the at least one sorting apparatus, and directing the product from the at least one sorting apparatus into the reject funnel, the accept funnel, or the memory (Continued)

bucket, responsive to determining that the product meets or exceeds a predetermined weight amount.

7 Claims, 38 Drawing Sheets

(51) Int. Cl.
    *B65B 1/32*     (2006.01)
    *B65B 1/46*     (2006.01)
    *G01G 13/24*     (2006.01)
    *G01G 19/393*     (2006.01)

(52) U.S. Cl.
    CPC ......... *G01G 13/247* (2013.01); *G01G 19/393* (2013.01)

(58) Field of Classification Search
    USPC .......................................... 53/502; 177/25.18
    See application file for complete search history.

(56) References Cited

U.S. PATENT DOCUMENTS

| | | | | |
|---|---|---|---|---|
| 4,901,807 | A | * | 2/1990 | Muskat et al. ....... G01G 19/393 177/199 |
| 2011/0079448 | A1 | * | 4/2011 | Almberg ................ G01G 13/34 177/116 |
| 2014/0360141 | A1 | | 12/2014 | Willard, III et al. |
| 2017/0174370 | A1 | * | 6/2017 | Vezzani .................... B65B 1/06 |
| 2021/0354930 | A1 | * | 11/2021 | Suemichi et al. ... G01G 19/393 |
| 2021/0372848 | A1 | * | 12/2021 | Suemichi et al. ... G01G 19/393 |
| 2021/0381878 | A1 | * | 12/2021 | Yokoyama et al. . G01G 19/393 |

FOREIGN PATENT DOCUMENTS

| | | | |
|---|---|---|---|
| EP | 2266424 A1 | | 12/2010 |
| JP | 2018077075 A | * | 5/2018 |
| JP | 2022035020 A | * | 3/2022 |

\* cited by examiner

SYSTEM AND METHOD FOR A PRODUCT PACKAGING ASSEMBLY

CROSS-REFERENCE TO RELATED APPLICATION

This application claims the benefit of U.S. Provisional Patent Application No. 63/447,854, entitled "SYSTEM AND METHOD FOR A PRODUCT PACKAGING ASSEMBLY," filed on 23 Feb. 2023, which is specifically incorporated by reference for all it discloses and teaches.

TECHNICAL FIELD

The present disclosure relates generally to product packaging assemblies.

BACKGROUND OF CERTAIN ASPECTS OF THE DISCLOSURE

At least some products are sold in semi-processed form or for consumption. For example, at least some consumable products, such as but not limited to cannabis, may be sold in various forms for consumption or further processing. Specifically, cannabis buds may be smoked, processed into a concentrate, processed into an infusion, and/or processed into other consumable forms. As such, it is advantageous for a producer to sell cannabis in a form that is capable of being processed into any consumable form.

Many cannabis producers sell cannabis in bud form. Buds refer to the petal less flowers of the cannabis plant. Buds, or "nugs," contain trichomes which in turn have compounds such as cannabinoids and terpenes that are the active ingredient in many products. After a plant is harvested, dried, and cured, buds can be dried and cured before being smoked or vaporized. Colas, large clusters of buds, are typically broken down into smaller, individual buds, and stems are removed before consumption.

Buds may also be processed into concentrates. Depending on the extraction method, only buds may be used (as in rosins), or the whole plant, including buds (as in live resins). All extraction methods aim to strip trichomes off buds or cannabis plant material. Buds may also be used to make infusions, which can then be used to make edibles. To do this, buds may be decarboxylated to activate cannabinoids.

Many consumable products such as cannabis are sold by weight. However, buds can be large and adding another bud to a package can cause the package to exceed a predetermined weight limit. Accordingly, there is a need for a system that accurately and automatically weighs buds and determines which package of a plurality of packages to place each bud in such that the weight of each package is an acceptable amount or within a predetermined weight amount.

BRIEF SUMMARY OF SOME ASPECTS OF THE DISCLOSURE

One aspect of the present disclosure relates to methods of packaging a product using a packaging system. The packaging system includes at least one weigh bucket, a sorting apparatus, at least one reject funnel, at least one accept funnel, and at least one memory bucket. The method includes loading the product into the packaging system and weighing the product with the at least one weigh bucket. The method further includes determining that the product meets or exceeds a predetermined weight amount. The method also includes dropping the product from the at least one weigh bucket into a sorting apparatus (e.g., the three-way swivel funnel). The method further includes directing the product from the at least one three-way swivel funnel into the at least one reject funnel, the at least one accept-funnel, or the at least one memory bucket, responsive to determining that the product meets or exceeds a predetermined weight amount.

Another aspect of the present disclosure relates to a packaging system including at least one weigh bucket configured to receive a product and weigh the product and at least one three-way swivel funnel configured to receive product from the at least one weigh bucket. The at least one weigh bucket is configured to drop product into the three-way swivel funnel and the at least one three-way swivel funnel is configured to direct the product to one of at least one reject funnel, at least one accept-funnel, and at least one memory bucket based on the weight of the product in the at least one weigh bucket, responsive to determining that the product meets or exceeds a predetermined weight amount.

Yet another aspect of the present disclosure relates to a product packaging assembly line including a packaging system including at least one weigh bucket configured to receive a product and weigh the product and at least one three-way swivel funnel configured to receive product from the at least one weigh bucket. The at least one weigh bucket is configured to drop product into the three-way swivel funnel and the at least one three-way swivel funnel is configured to direct the product to one of at least one reject funnel, at least one accept-funnel, and at least one memory bucket based on the weight of the product in the at least one weigh bucket, responsive to determining that the product meets or exceeds a predetermined weight amount.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

BRIEF DESCRIPTION OF THE DRAWINGS

A further understanding of the nature and advantages of the embodiments may be realized by reference to the following drawings. In the appended figures, similar components or features may have the same reference label.

Figure 1:
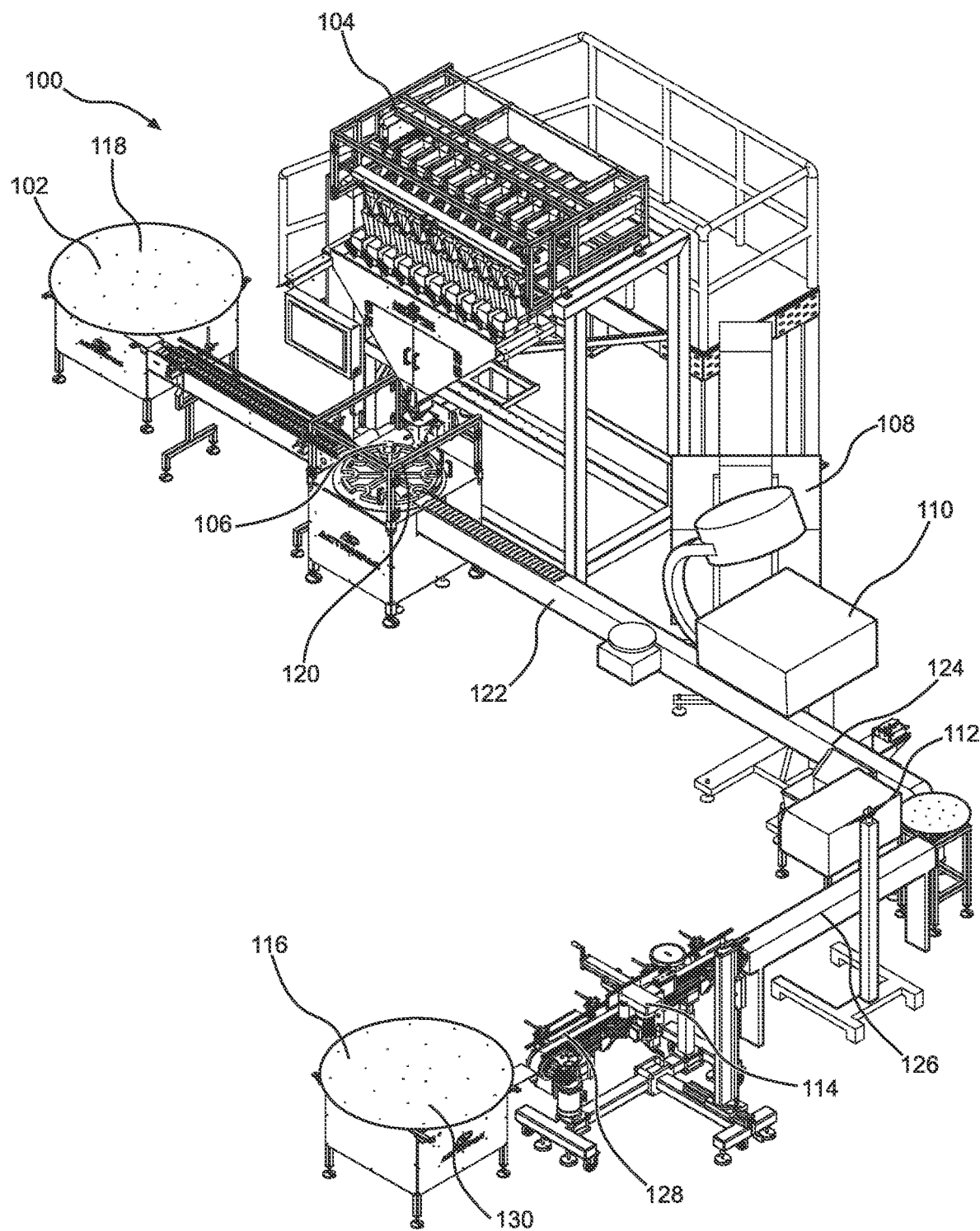
FIG. 1 illustrates a perspective view of a product packaging assembly line.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure include systems and methods for packaging a product. More specifically, embodiments of the present disclosure include a product packaging system and a method for using the system. The system is illustrated in the attached figures and includes an assembly line including various components including a packaging system. The packaging system is configured to receive a product, accurately weigh the product, and insert the accurately weighed product in a package.

The packaging system may also be configured to determine if a product meets or exceeds predetermined weight requirements and sort the product based on the weight in order to place product in compliance with certain laws, regulations, or policies in the package. For purposes of this disclosure, "meeting a predetermined product weight amount" or "falling within a predetermined product weight range" may be used interchangeably to mean that a product weight complies with specific weight requirements. In the illustrated embodiment, the product includes cannabis. More specifically, in the illustrated embodiment, the product includes cannabis buds. In alternative embodiments, the product may be any product that enables the systems described herein to operate as described herein. For example, the product may be coffee or food. In the illustrated embodiment, the packaging system includes a hopper, at least one rear feeder, at least one front feeder, at least one weigh bucket, at least one lane gate, at least one three-way pre-funnel, at least one three-way swivel funnel, at least one reject funnel, at least one accept funnel, and at least one memory bucket.

In some embodiments, the packaging system also includes at least one holding bucket or other container (e.g., packaging container, poucher) configured to receive the product from the at least one accept bucket or the at least one memory bucket. In some embodiments, the packaging system does not include a holding bucket or other container and the at least one accept bucket and the at least one memory bucket are configured to drop or disperse the product into another location (e.g., conveyor belt, other equipment, etc. for further processing or packaging.

In some embodiments, the product is packaged by first loading the product into the hopper. The rear feeder then moves the product forward to the front feeder. The front feeder then moves the product into the weigh buckets. The lane gate shuts, and the product is prevented from moving into the weigh buckets. The weigh buckets weigh the product and drop a combination of product (a combination of cannabis buds) down into a pre-funnel. The pre-funnel may be a single or multi-way pre-funnel configured to guide the product to a specific location based on the weight of the product. For example, the pre-funnel may guide the cannabis buds to a sorting apparatus or funnel (e.g., a swivel funnel). The pre-funnel may be a three-way pre-funnel that guides the cannabis buds into a three-way swivel funnel, and then to the specific location. In another example, a two-way pre-funnel may guide the product into a two-way swivel funnel. Other mechanisms for sorting the product based on weight are contemplated. Once the product is in the sorting apparatus or funnel, the product may be directed to the specific location based on the product weight.

Certain products, such as cannabis, may require packaging that contains a predetermined product weight amount or predetermined product weight range in order to comply with laws, regulations, or policies. Therefore, the product may be sorted into funnels or buckets based on compliance with a predetermined product weight amount. In some embodiments, the product may be sorted into an accept funnel or a reject funnel, depending on whether the product weight is or is not in compliance, respectively. In some embodiments, the three-way swivel funnel may direct cannabis buds into a reject funnel, an accept funnel, or a memory bucket. Cannabis buds that do not meet or exceed the predetermined product weight amount or predetermined product weight range are out of tolerance and are rejected into the rejected funnel. Cannabis buds that meet a predetermined product weight amount or fall within a predetermined product weight range are dropped from the weigh bucket down into the accept funnel or the memory bucket. The accept funnel drops the cannabis buds directly into a holding bucket, or other container or equipment. In some instances, cannabis buds whose weight is within a predetermined weight amount may be dropped into the memory bucket for use later. For example, if the cannabis buds are within the predetermined weight amount but whose inclusion in the holding bucket may cause the product within the holding bucket to exceed a predetermined weight amount for the holding bucket, then the cannabis buds may be dropped into the memory bucket. Once inclusion of the cannabis buds in the memory bucket cause the product within the holding bucket to meet the predetermined weight amount for the holding bucket, the memory bucket may drop the cannabis buds into the accept funnel.

In some embodiments, the system may drop a combination of cannabis buds from the accept funnel and from the memory bucket into the holding bucket to achieve the predetermined weight. The holding bucket receives the combination of cannabis buds in a central location and drops the cannabis buds into other equipment or directly into a package.

Accordingly, the packaging system described herein is configured to receive the product, accurately weigh the product, and transport the accurately weighed product to additional equipment for further processing or to packaging. In the illustrated embodiment, the product includes cannabis buds and the packaging system weighs buds and selects an appropriate combination of buds for each packaging such that a weight of the packaging is within a predetermined weight amount. The packaging system then delivers the selected buds to the additional equipment for further processing. As such, the packaging system described herein automatically delivers an accurately weighed amount of product that is within a set tolerance for packaging and retail sale, simplifying the packaging process, reducing costs, reducing errors, and increasing profits.

Figure 2:
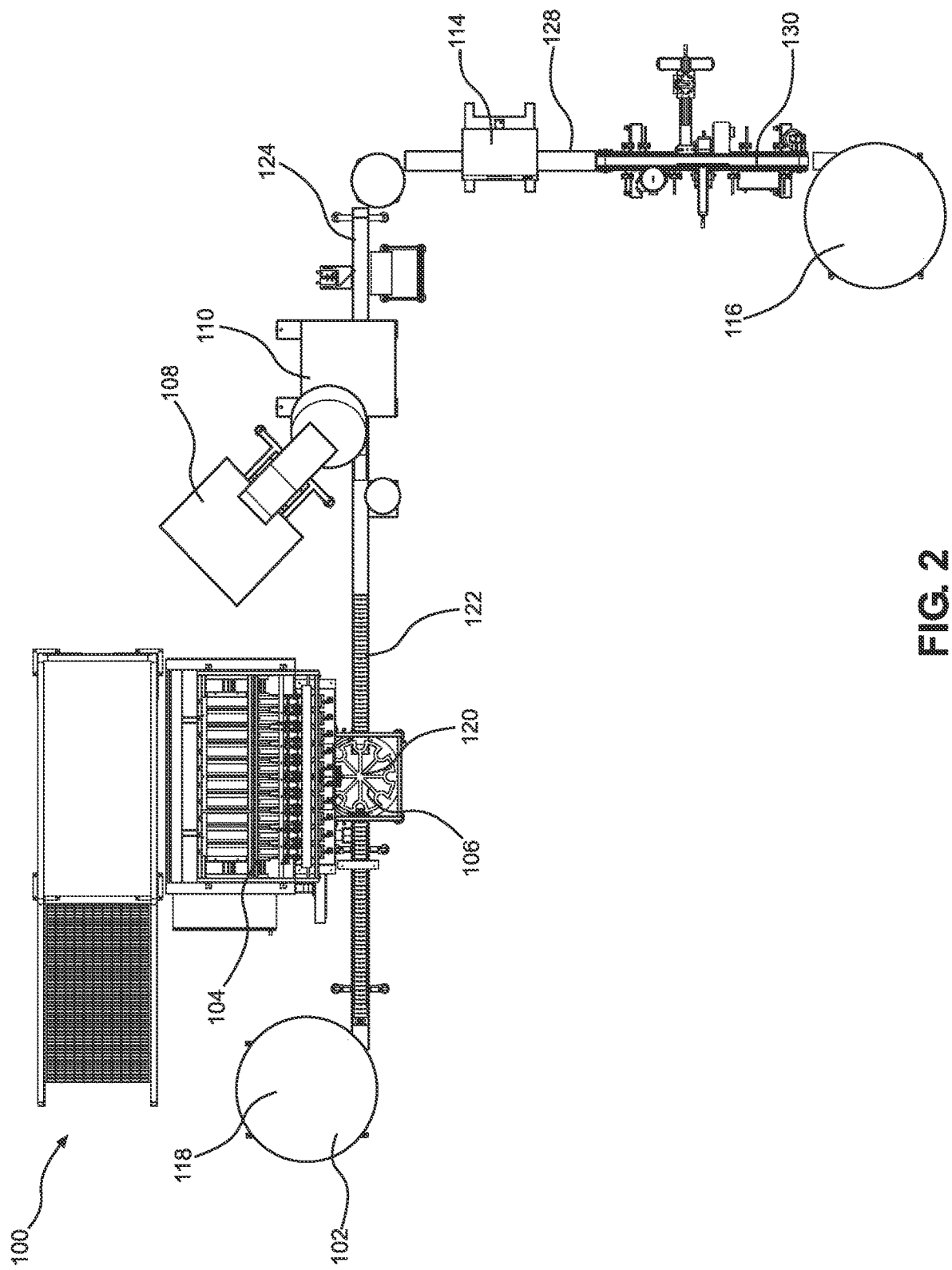
FIG. 2 illustrates a top view of the product packaging assembly line shown in FIG. 1.
Figure 3:
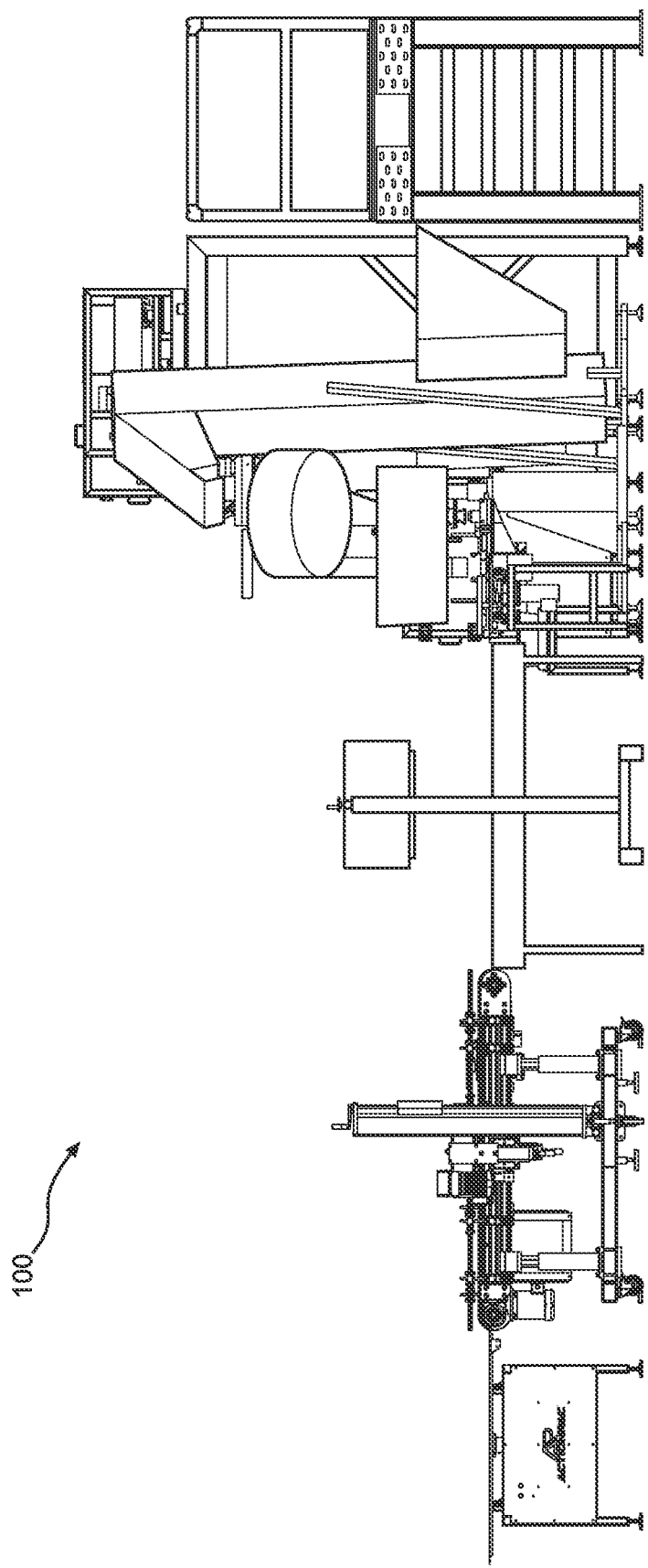
FIG. 3 illustrates a side view of the product packaging assembly line shown in FIG. 1.
Figure 4:
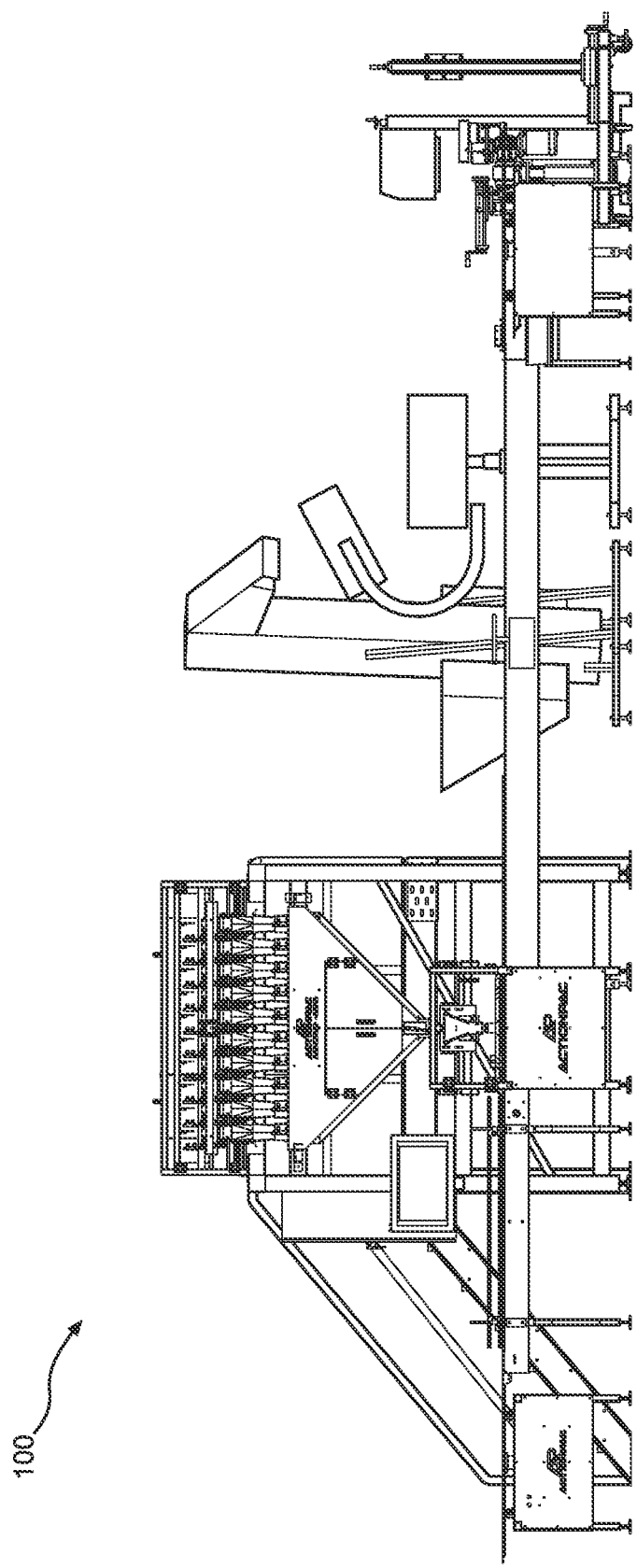
FIG. 4 illustrates another side view of the product packaging assembly line shown in FIG. 1.

FIG. 1 illustrates a perspective view of a product packaging assembly line 100. FIG. 2 illustrates a top view of the product packaging assembly line 100. FIG. 3 illustrates a side view of the product packaging assembly line 100. FIG. 4 illustrates another side view of the product packaging assembly line 100. As shown in FIGS. 1-4, the product packaging assembly line 100 includes a descrambling system 102, a packaging system 104, a weight quality control system 106, a capper elevator 108, a capper 110, a sealer 112, a labeler 114, and a collection system 116.

The product packaging assembly line 100 is configured to receive a product, package the product in a packaging, seal the packaging, label the packaging, and deliver the sealed and labeled packaging in an easily shipped configuration. Specifically, in the illustrated embodiment, the product includes cannabis buds. In alternative embodiments, the product may be any consumable product that enables the systems described herein to operate as described herein. For example, the consumable product may include any product that has comes in various sized particulates, that needs to be accurately weighed out, and packaged according to the particulate size.

The packaging may include any packaging that enables the systems described herein to operate as described herein. For example, in some embodiments, the packaging may include bags, jars, and/or boxes. More specifically, in some embodiment, the packaging may include plastic bags, paper bags, glass jars, plastic jars, plastic boxes, plastic containers, metal tins, and/or any container that enables the systems described herein to operate as described herein. In the embodiment illustrated in FIGS. 1-4, the product packaging assembly line 100 is configured to package product in rigid and/or solid containers such as jars and/or boxes that are configured to receive a cap. In the embodiment illustrated in FIGS. 5-8, a product packaging assembly line 200 is configured to package product in non-rigid containers such as bags and/or pouches that are not configured to receive a cap.

In the illustrated embodiment, the descrambling system 102 is configured to receive rigid and/or solid containers such as jars and/or boxes and deliver the containers to the packaging system 104. The descrambling system 102 may be an automated system, a manual system, and/or a hybrid system with automated and manual capabilities. For example, in the illustrated embodiment, the descrambling system 102 includes a hybrid system including a descrambling table 118. An operator manually places the containers on the descrambling table 118 such that an opening of the containers is arranged in an upward configuration. A conveyor then automatically transports the containers to the packaging system 104 for further processing. In alternative embodiments, the descrambling system 102 may be a fully automated system that automatically receives the containers, orients the containers, and transports the containers to the packaging system 104 without any operator intervention. Furthermore, the descrambling system 102 may be any system that enables the systems described herein to operate as described herein.

As described in more detail below, the packaging system 104 is configured to receive the product, accurately weigh the product, and transport the product to the weight quality control system 106. In the illustrated embodiment, the product includes cannabis buds and the packaging system 104 weighs each bud or group of buds and selects an appropriate combination of buds for each packaging such that a weight of the packaging is within a predetermined weight amount. The packaging system 104 then delivers the selected buds to the weight quality control system 106 and the packaging such that the buds remain in the packaging throughout the packaging process. In alternative embodiments, the packaging system 104 may not package the product. Rather, the accurately weighed product is sent to additional equipment for packaging.

In the illustrated embodiment, the weight quality control system 106 includes a starwheel weight checking system 120 to check the weight of each packaging to ensure that each packaging, including the accurately weighed product, meets a predetermined product weight amount or falls within a predetermined product weight range. Specifically, the starwheel weight checking system 120 receives the packing from the descrambling system 102 and positions the packaging beneath the packaging system 104. The starwheel weight checking system 120 then sets the tare weight (the weight of the unpackaged packaging) to zero, and weighs each packaging to ensure that a weight of the buds within the packaging is within the predetermined weight amount. In alternative embodiments, the packaging system 104 and the starwheel weight checking system 120 may not package the product. Rather, the accurately weighed product is sent to additional equipment for packaging and the starwheel weight checking system 120 checks the weight of the accurately weighed product before packaging. The weight quality control system 106 then transports the packaging to the capper elevator 108 for further processing using additional transport equipment. In the illustrated embodiment, the transport equipment includes a conveyor 122. In alternative embodiments, the transport equipment may include any equipment that enables the systems described herein to operate as described herein.

The capper elevator 108 is configured to receive caps for the packaging, sort and orient the caps, and deliver the caps to the capper 110 for placement on the packaging. In the illustrated embodiment, the capper elevator 108 includes a stand, a hopper, a sensor, an inclined conveyor with a cleated belt, a motor, and a dust cover. In alternative embodiments, the capper elevator 108 may include any equipment that enables the systems described herein to operate as described herein.

The capper 110 is configured to receive the properly sorted and oriented caps from the capper elevator 108 and position the caps on the packaging. In the illustrated embodiment, the capper 110 includes an adjustable stand, a bowl feeder, and pneumatic driven chute, a sensor, multiple belts, a motor, plastic guides, and a control panel. In alternative embodiments, the capper 110 may include any equipment that enables the systems described herein to operate as described herein. The capper 110 then transports the packaging, including the cap, to the sealer 112 for further processing using additional transport equipment. In the illustrated embodiment, the transport equipment includes a conveyor 124. In alternative embodiments, the transport equipment may include any equipment that enables the systems described herein to operate as described herein.

The sealer 112 is configured to receive the packaging, including the cap, from the capper 110 and seal the caps on the packaging. In the illustrated embodiment, the sealer 112 includes an induction sealer including an adjustable stand, induction seal head, and a control panel. In alternative embodiments, the sealer 112 may include any equipment that enables the systems described herein to operate as described herein. The scaler 112 then transports the packaging, including the sealed cap, to the labeler 114 for further processing using additional transport equipment. In the illustrated embodiment, the transport equipment includes a conveyor 126. In alternative embodiments, the transport equipment may include any equipment that enables the systems described herein to operate as described herein.

The labeler 114 is configured to receive the packaging, including the sealed cap, from the sealer 112 and place a label identifying the product on the packaging. In the illustrated embodiment, the labeler 114 includes an adjustable stand, a conveyor, a motor, a belt, a control panel, a printer, an encoder, a label head, a metering wheel, a wrap belt, and an optional vision system. In alternative embodiments, the labeler 114 may include any equipment that enables the systems described herein to operate as described herein. The labeler 114 then transports the packaging, including the label, to the collection system 116 for further processing using additional transport equipment. In the illustrated embodiment, the transport equipment includes a conveyor 128. In alternative embodiments, the transport equipment may include any equipment that enables the systems described herein to operate as described herein.

The collection system 116 is configured to receive the packaging, including the label, from the labeler 114 and prepare the packaging for shipping to a retailor and/or consumer. In the illustrated embodiment, the collection system 116 includes a collection table 130 configured to receive the labeled packaging. An operator manually places the labeled packaging in boxes for shipping on the collection table 130. The collection table 130 includes an adjustable stand, a motor, a rotating surface, guide rails, a variable frequency drive (VFD), and a control panel. In alternative embodiments, the collection system 116 may be a fully automated system that automatically prepares the packaging for shipping without any operator intervention. Furthermore, the collection system 116 may be any system that enables the systems described herein to operate as described herein.

Figure 5:
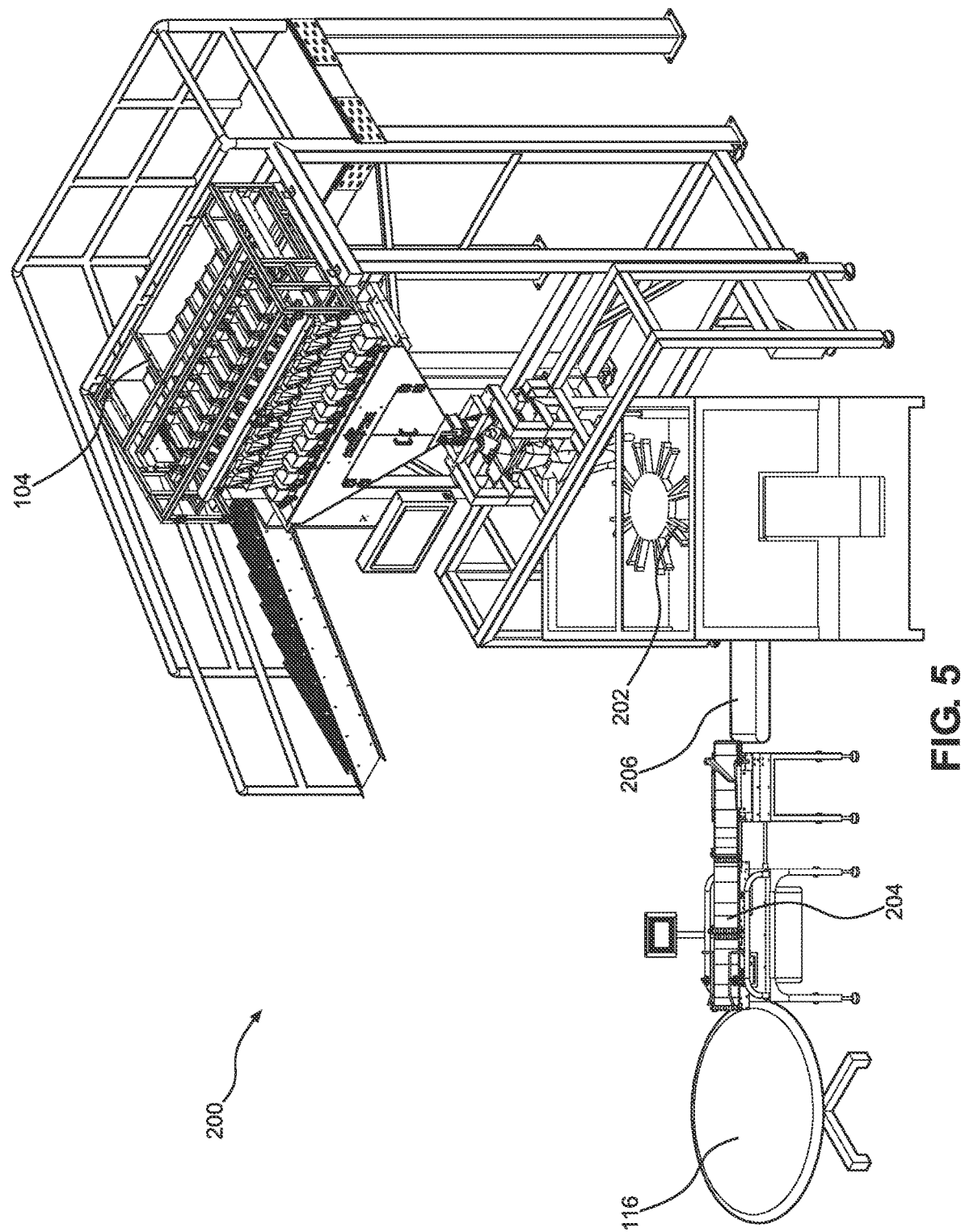
FIG. 5 illustrates a perspective view of an alternative product packaging assembly line.
Figure 6:
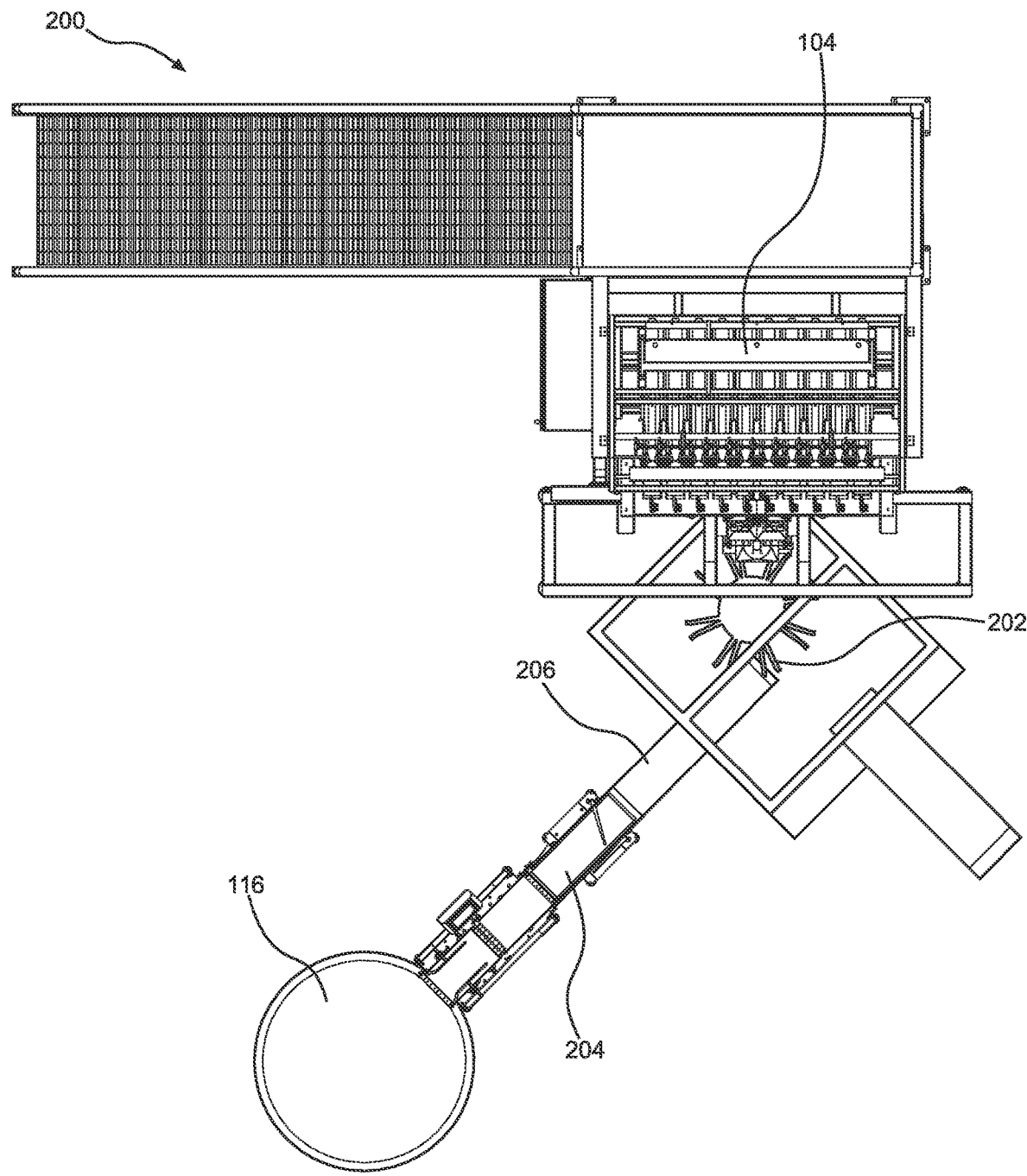
FIG. 6 illustrates a top view of the product packaging assembly line shown in FIG. 5.
Figure 7:
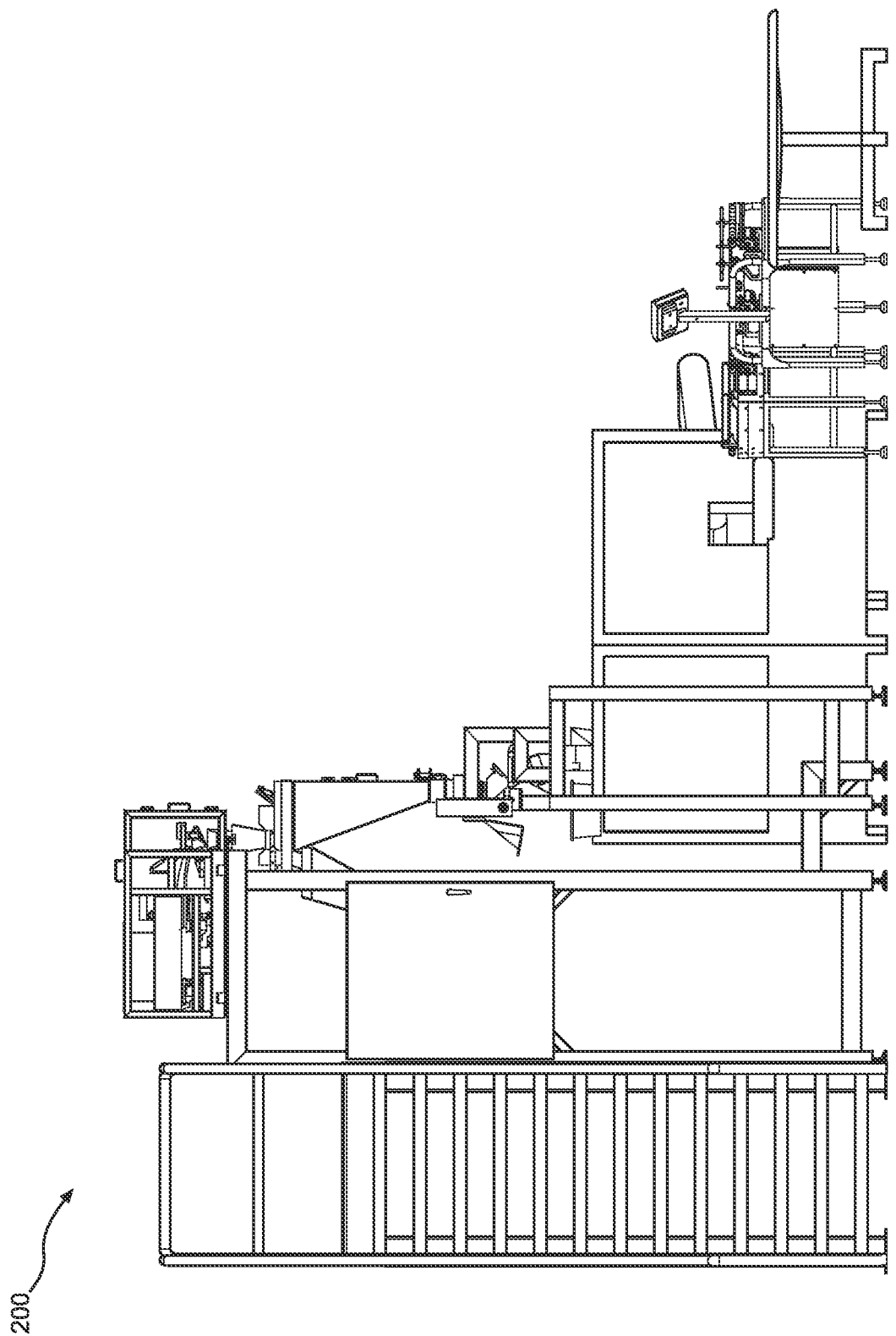
FIG. 7 illustrates a side view of the product packaging assembly line shown in FIG. 5.
Figure 8:
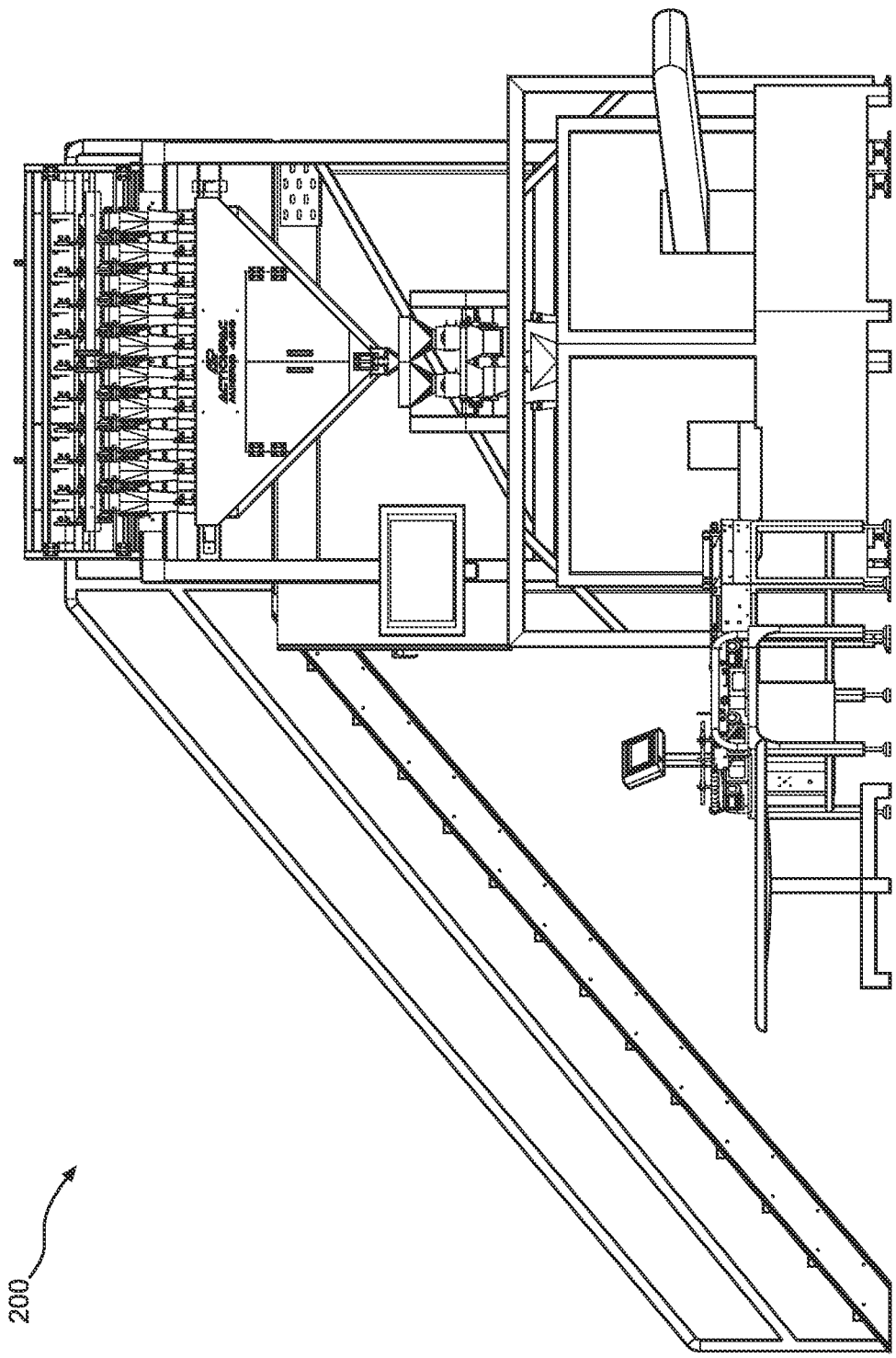
FIG. 8 illustrates another side view of the product packaging assembly line shown in FIG. 5.

FIG. 5 illustrates a perspective view of an alternative product packaging assembly line 200. FIG. 6 illustrates a top view of the product packaging assembly line 200. FIG. 7 illustrates a side view of the product packaging assembly line 200. FIG. 8 illustrates another side view of the product packaging assembly line 200. As shown in FIGS. 5-8, the product packaging assembly line 200 includes the packaging system 104, a poucher 202, a weight quality control system 204, and the collection system 116.

The product packaging assembly line 200 is similar to the product packaging assembly line 100 and is configured to receive a product, package the product in a packaging, seal the packaging, label the packaging, and deliver the sealed and labeled packaging in an easily shipped configuration. Specifically, in the illustrated embodiment, the product packaging assembly line 200 is configured to package the same product in the same packaging as the product packaging assembly line 100. However, in the embodiment illustrated in FIGS. 1-4, the product packaging assembly line 100 is configured to package product in rigid and/or solid containers such as jars and/or boxes that are configured to receive a cap. In the embodiment illustrated in FIGS. 5-8, a product packaging assembly line 200 is configured to package product in non-rigid containers such as bags and/or pouches that are not configured to receive a cap.

The packaging system 104 used in the product packaging assembly line 200 is the same as the packaging system 104 used in the product packaging assembly line 100 and is configured to receive the product, accurately weigh the product, and transport the accurately weighed product to the poucher 202. In the illustrated embodiment, the product includes cannabis buds and the packaging system 104 weighs each bud and selects an appropriate combination of buds for each packaging such that a weight of the buds within the packaging meets a predetermined product weight amount or falls within a predetermined product weight range. The packaging system 104 then delivers the selected buds to the poucher 202.

The poucher 202 is configured to receive the accurately weighed product from the packaging system 104 and package the product in the packaging including a pouch or bag. In the illustrated embodiment, the poucher 202 includes a pouch feeding conveyor, a printer, a zipper opener, pneumatic suction cups, a funnel, a zipper sealer, a heat sealer, a hole puncher, a pneumatic vibrator, a nitrogen inserter, an indexing wheel, and an output conveyor. In alternative embodiments, the poucher 202 may include any equipment that enables the systems described herein to operate as described herein. The poucher 202 then transports the packaging, including the accurately weighed product, to the weight quality control system 204 for further processing using additional transport equipment. In the illustrated embodiment, the transport equipment includes a conveyor 206. In alternative embodiments, the transport equipment may include any equipment that enables the systems described herein to operate as described herein.

In the illustrated embodiment, the weight quality control system 204 includes an adjustable stand, conveyors, a motor, load cells, a reject, and an HMI control panel. The weight quality control system 204 then transports the packaging to the collection system 116 for further processing using additional transport equipment. In the illustrated embodiment, the transport equipment includes a conveyor 206. In alternative embodiments, the transport equipment may include any equipment that enables the systems described herein to operate as described herein.

The collection system 116 is configured to receive the packaging from the weight quality control system 204 and prepare the packaging for shipping to a retailor and/or consumer. In the illustrated embodiment, the collection system 116 includes a collection table 130 configured to receive the labeled packaging. An operator manually removes the labeled containers from the collection table 130. In alternative embodiments, the collection system 116 may be a fully automated system that automatically prepares the packaging for shipping without any operator intervention. Furthermore, the collection system 116 may be any system that enables the systems described herein to operate as described herein.

Figure 9:
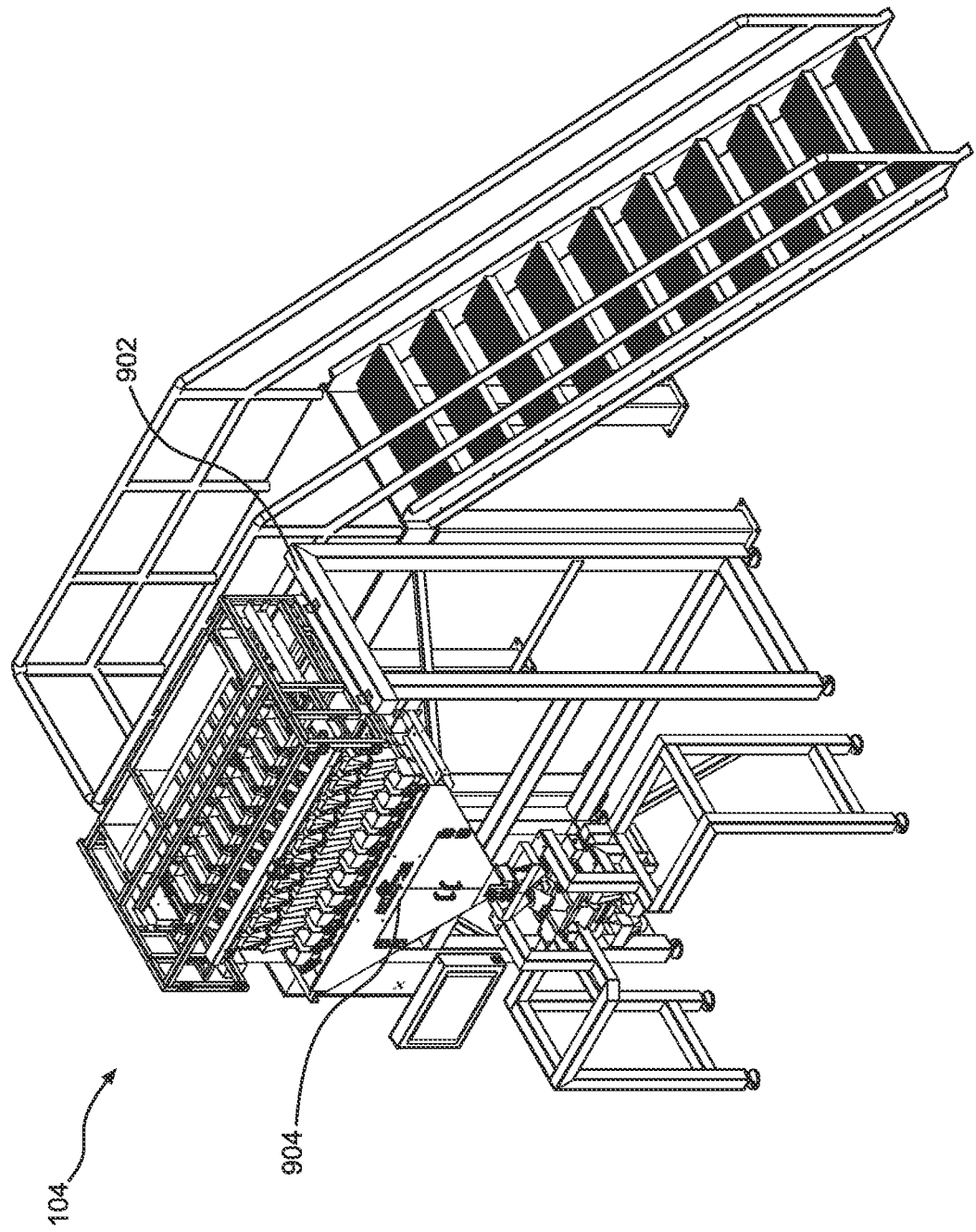
FIG. 9 illustrates a perspective view of the packaging system shown in FIG. 1.

FIG. 9 illustrates a perspective view of the packaging system 104 as a standalone system. The packaging system 104 illustrated in FIG. 9 may be used as a hybrid manual/automatic packaging system. The packaging system 104 illustrated in FIG. 9 is the same as the packaging systems 104 used in the product packaging assembly lines 100 and 200 and is configured to receive the product, accurately weigh the product, and transport the accurately weighed product to packaging. Specifically, an operator may be stationed below the packaging system 104 and may manually position packaging below the packaging system 104. The packaging system 104 then deposits buds in the packaging positioned below the packaging system 104 by the operator. The packaging system 104 may be equipped with an activation device (a foot pedal, a button, a lever, etc.) that the operator activates each time a packaging is positioned below the packaging system 104 and ready to receive buds. In the illustrated embodiment, the product includes cannabis buds and the packaging system 104 weighs each bud and selects an appropriate combination of buds for each packaging such that a weight of the buds within the packaging is a predetermined product weight amount or falls within a predetermined product weight range.

Figure 10:
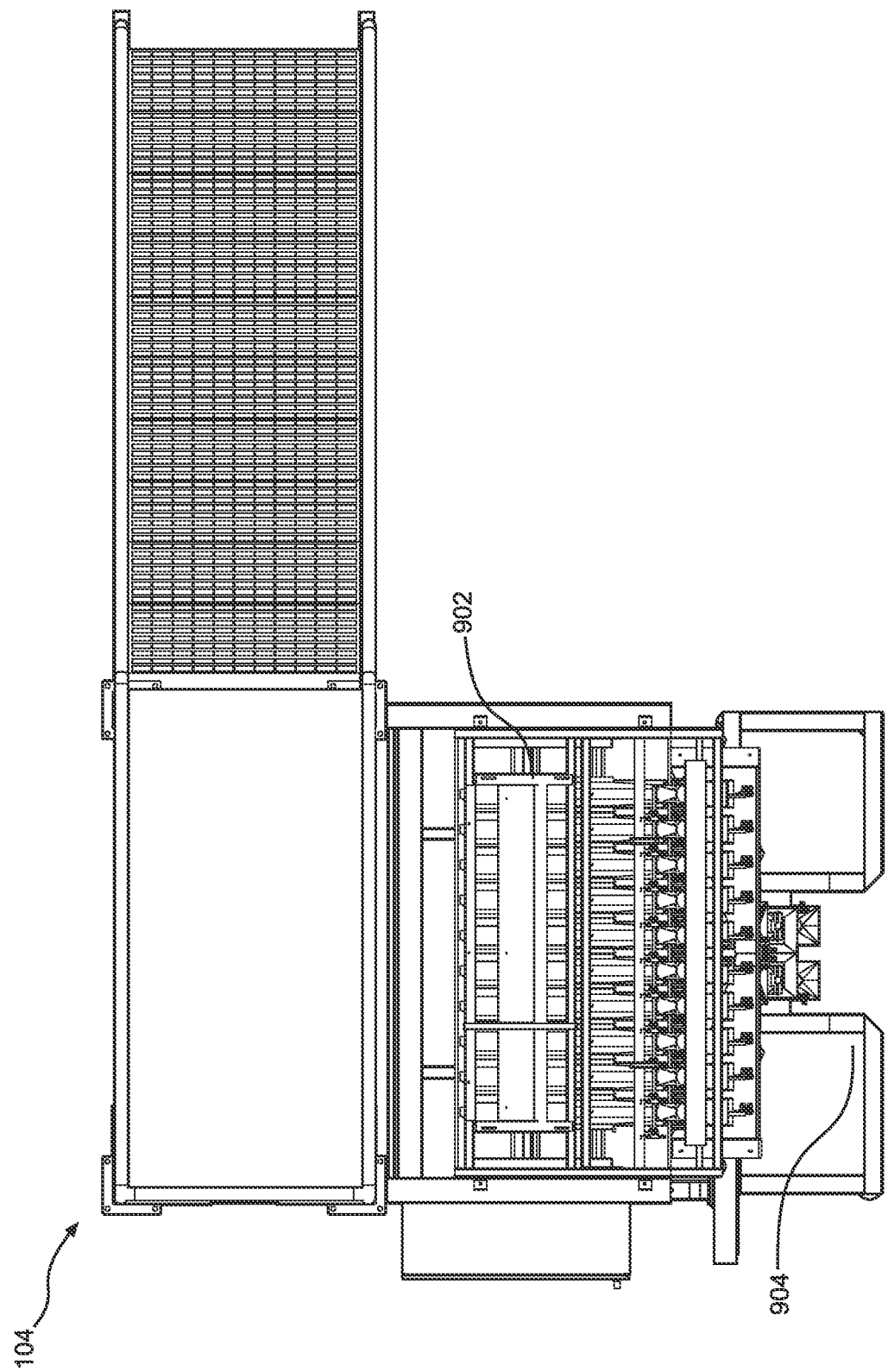
FIG. 10 illustrates a top view of the packaging system shown in FIG. 1.
Figure 11:
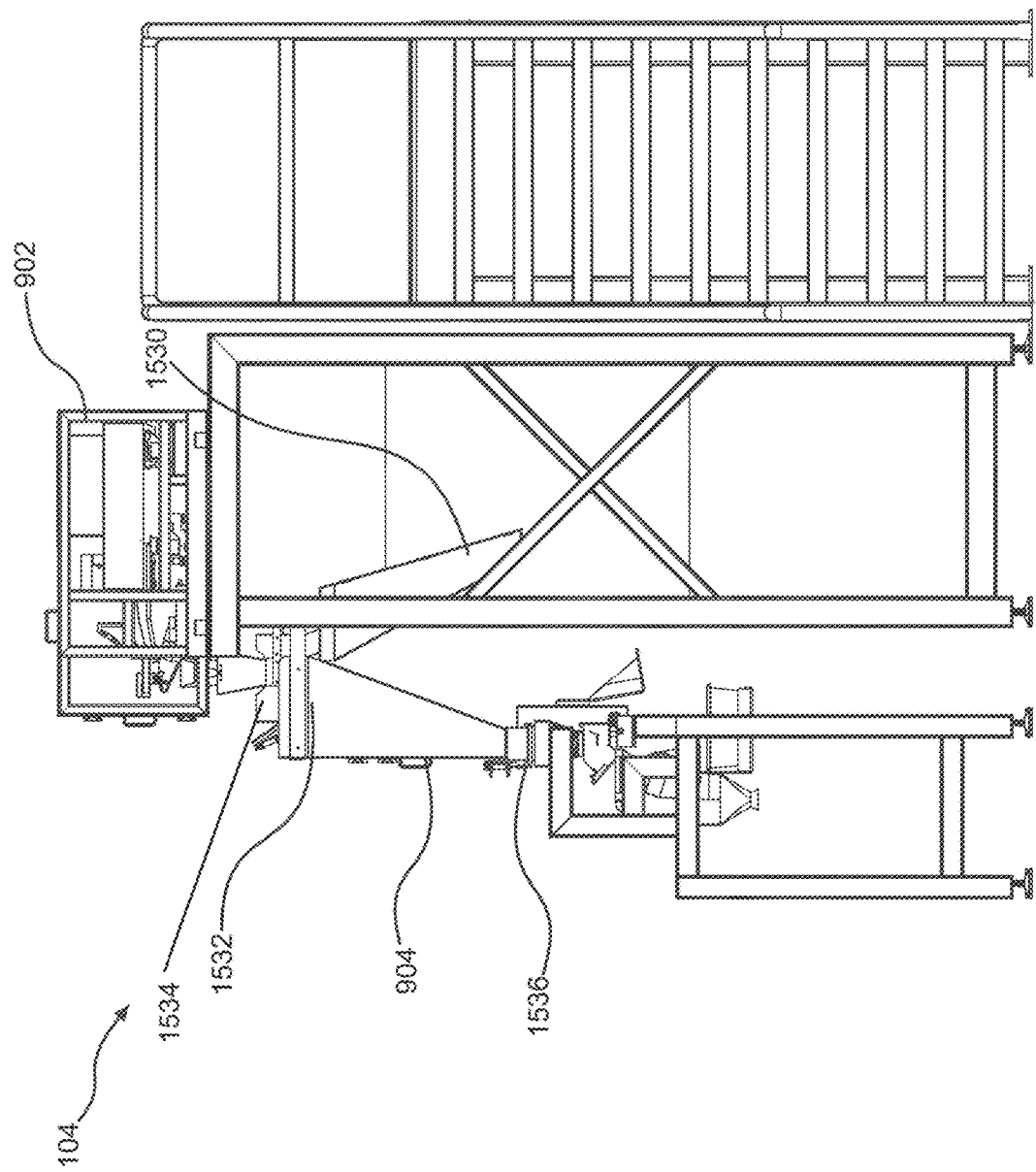
FIG. 11 illustrates a front view of the packaging system shown in FIG. 1.
Figure 12:
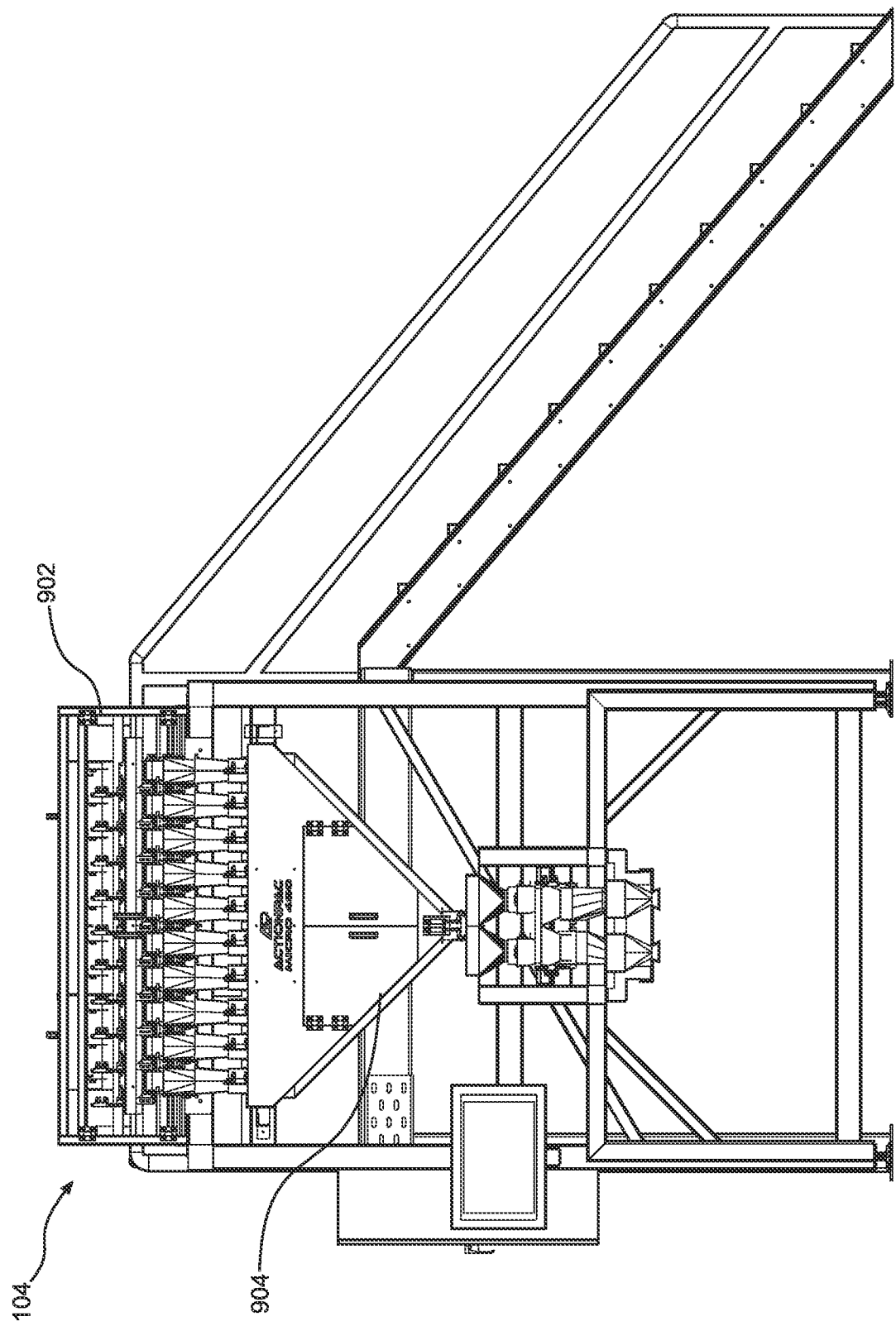
FIG. 12 illustrates a side view of the packaging system shown in FIG. 1.

FIG. 10 illustrates a top view of the packaging system 104. FIG. 11 illustrates a front view of the packaging system 104. FIG. 12 illustrates a side view of the packaging system 104. As shown in FIGS. 9-12, the packaging system 104 includes an upper, scale assembly 902 and a lower, dispensing assembly 904. The upper, scale assembly 902 and the lower, dispensing assembly 904 are encased in a casing (not shown) to prevent breezes from affecting the measured weight of the product. In the illustrated embodiment, the upper, scale assembly 902 and the lower, dispensing assembly 904 are encased in a lexan casing. In alternative embodiments, the upper, scale assembly 902 and the lower, dispensing assembly 904 maybe encased in any type of casing that enables the packaging system 104 described herein to operate as described herein. The upper, scale assembly 902 is configured to receive product, accurately weigh the product, and transport the product to the lower, dispensing assembly 904. The lower, dispensing assembly 904 is configured to receive product from the upper, scale assembly 902, sort the product based on the weight of the product determined by the upper, scale assembly 902, and transport the product to packaging or other equipment for further processing.

Figure 13:
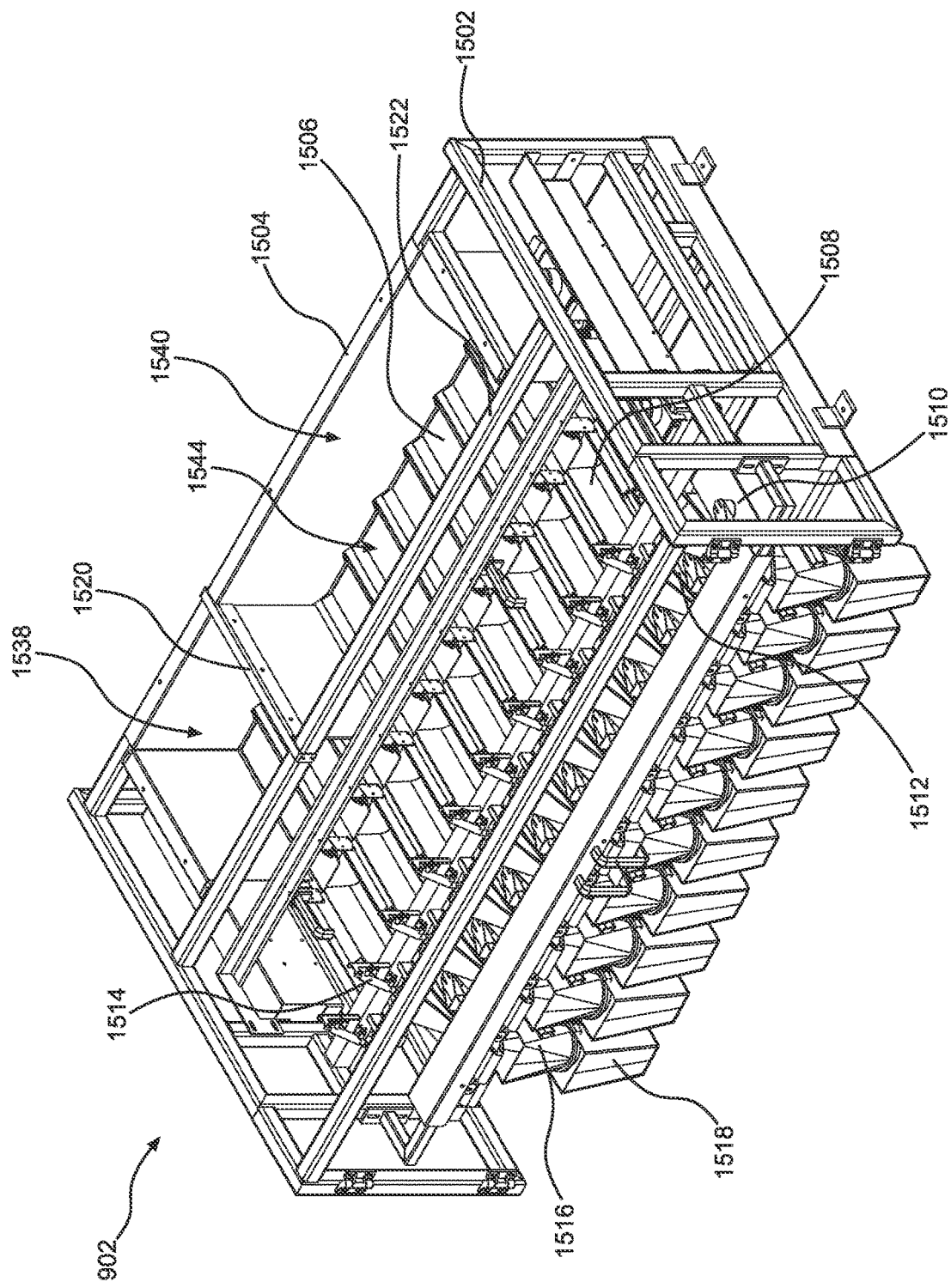
FIG. 13 illustrates a perspective view of the upper, scale assembly shown in FIG. 9.
Figure 14:
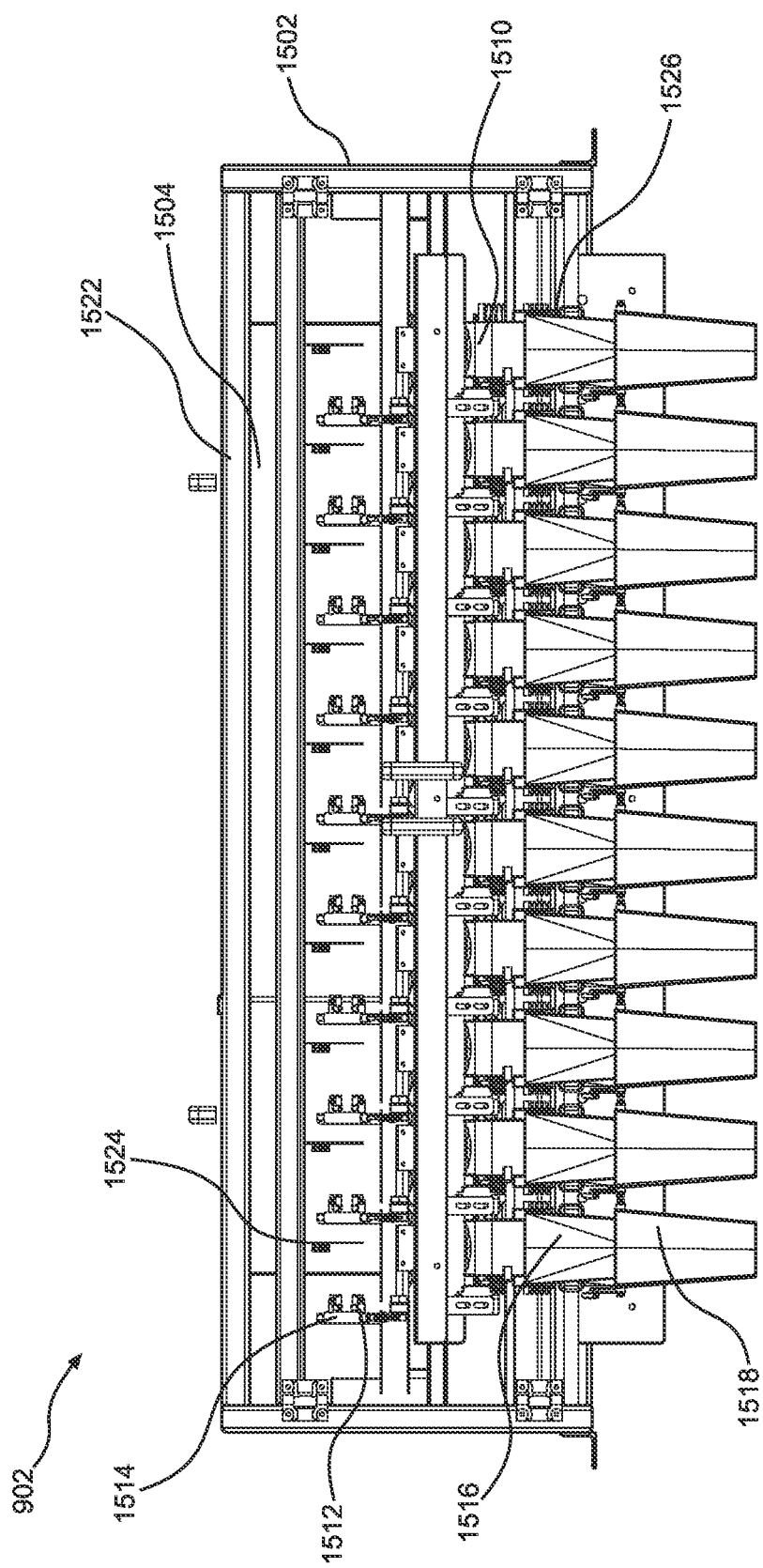
FIG. 14 illustrates a front view of the upper, scale assembly shown in FIG. 9.
Figure 15:
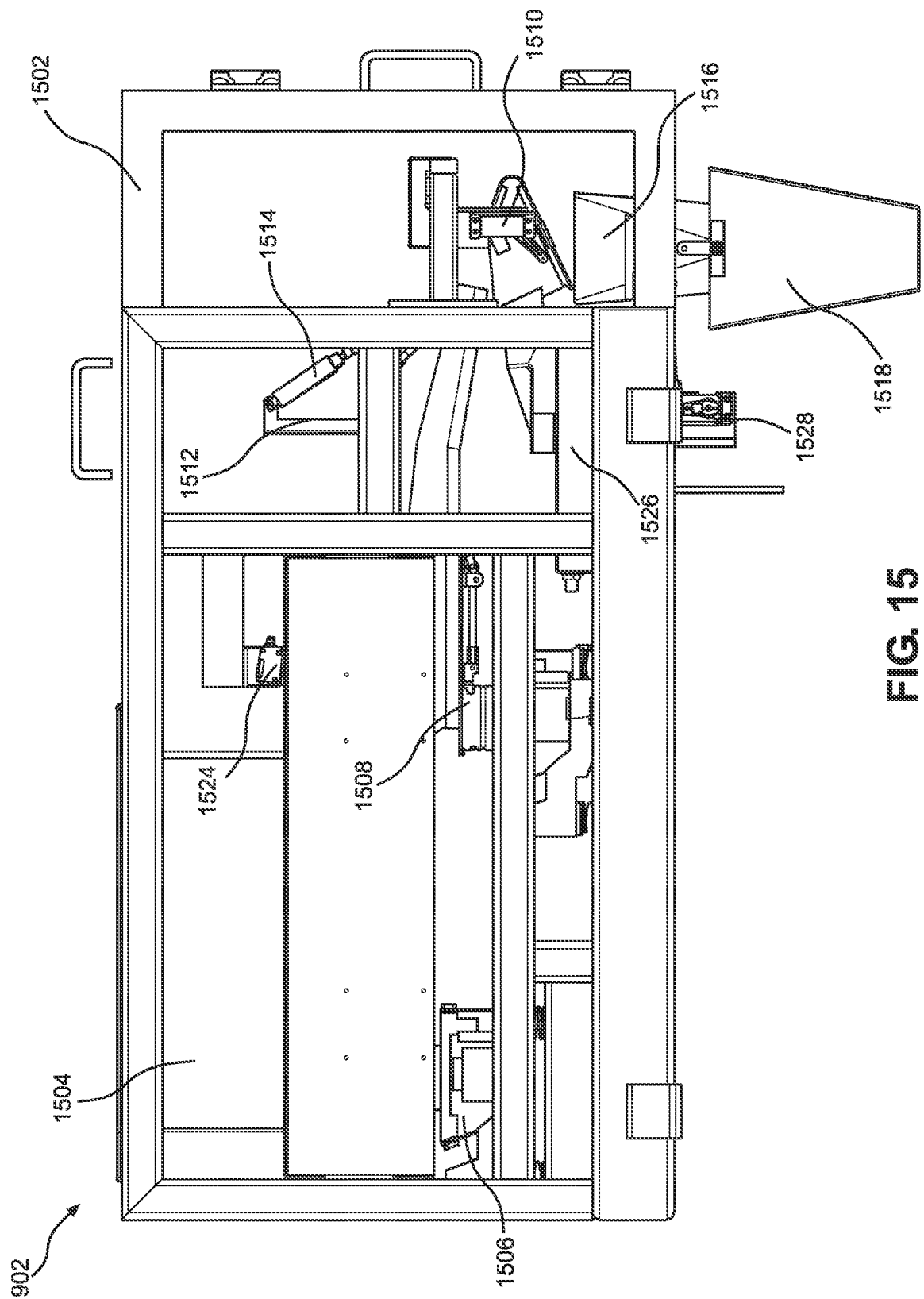
FIG. 15 illustrates a side view of the upper, scale assembly shown in FIG. 9.
Figure 16:
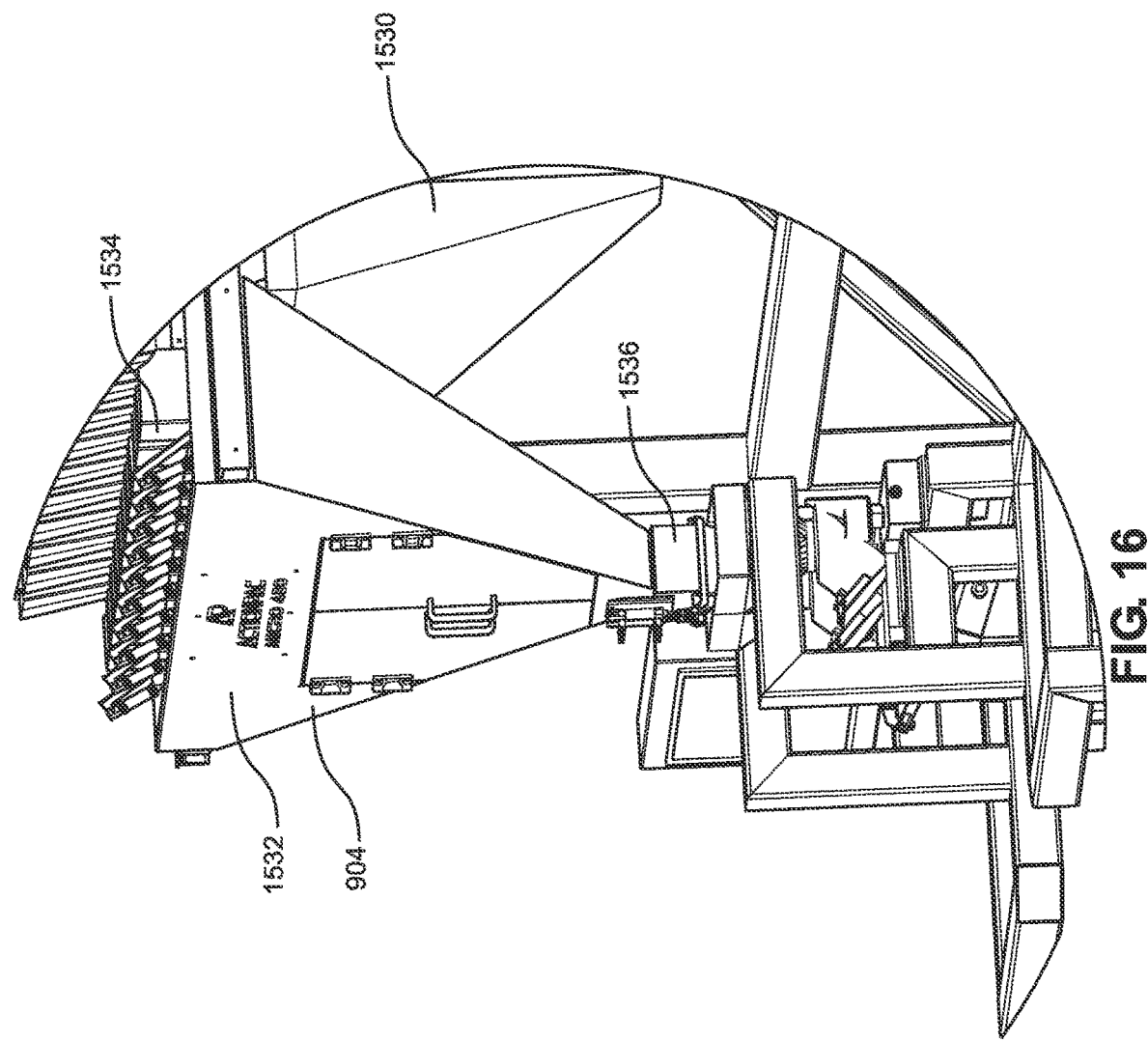
FIG. 16 illustrates a perspective view of the lower, dispensing assembly shown in FIG. 9.
Figure 17:
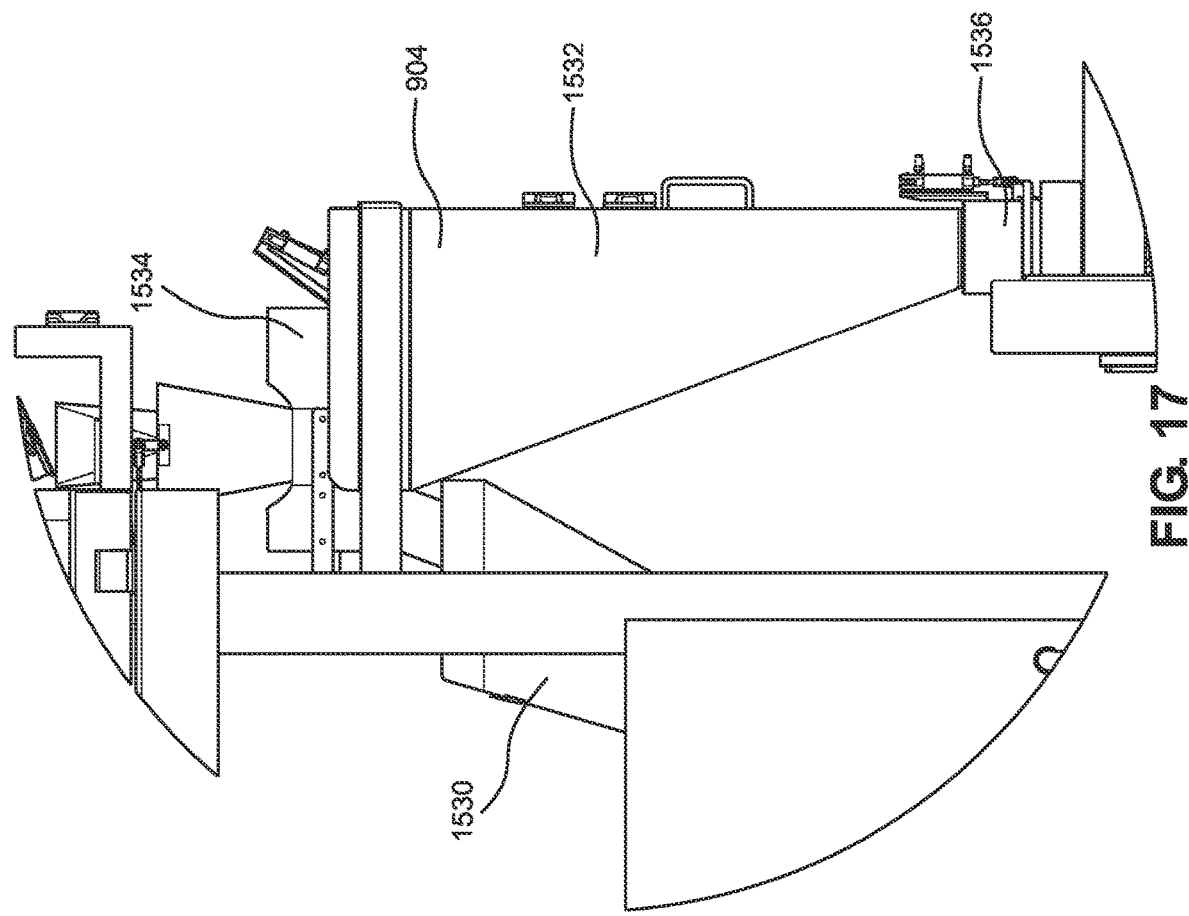
FIG. 17 illustrates a partial side view of the lower, dispensing assembly shown in FIG. 9.
Figure 18:
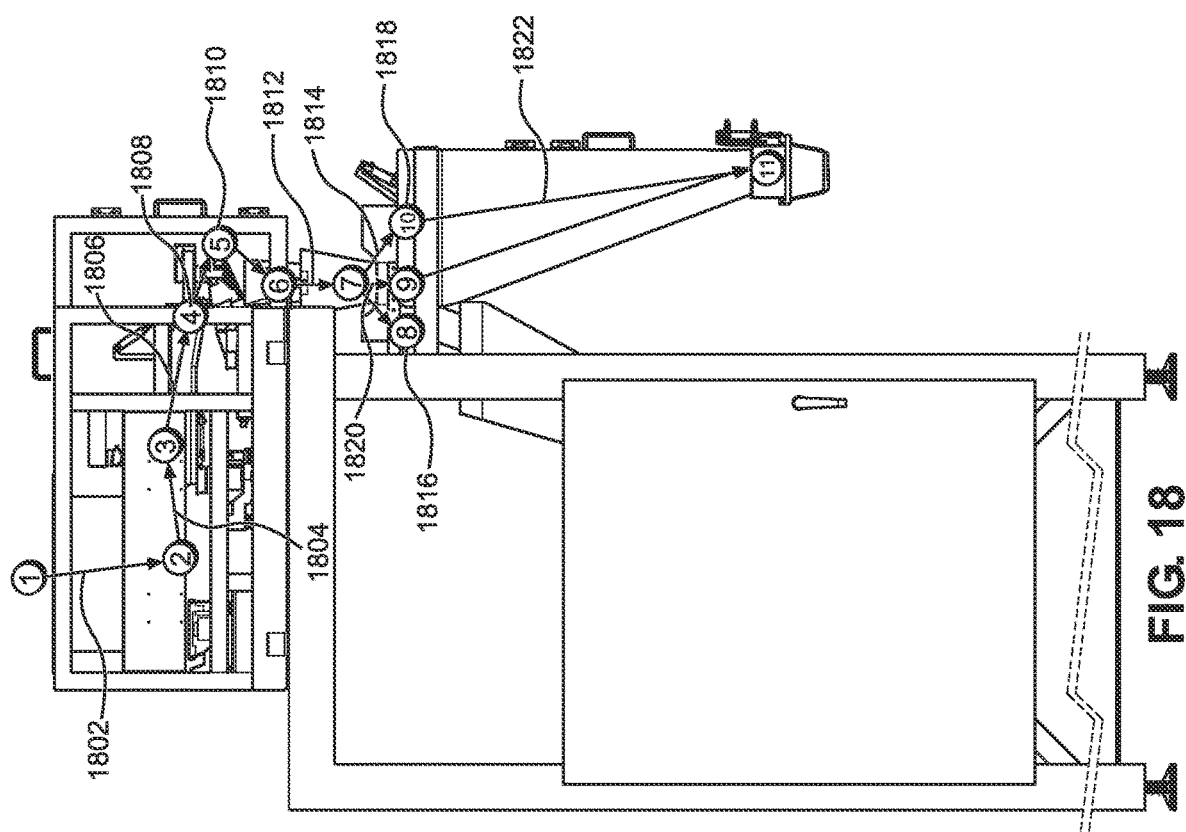
FIG. 18 illustrates a side view of the packaging system shown in FIG. 9 including arrows illustrating a flow path of buds through the packaging system.

FIG. 13 illustrates a perspective view of the upper, scale assembly 902. FIG. 14 illustrates a front view of the upper, scale assembly 902. FIG. 15 illustrates a side view of the upper, scale assembly 902. FIG. 16 illustrates a perspective view of the lower, dispensing assembly 904. FIG. 17 illustrates a partial side view of the lower, dispensing assembly 904. FIG. 18 illustrates a side view of the packaging system 104 including arrows illustrating a flow path of buds through the packaging system 104. As shown in FIGS. 9-18, the upper, scale assembly 902 and the lower, dispensing assembly 904 include a frame 1502, a hopper 1504, at least one rear feeder 1506, at least one front feeder 1508, at least one weigh bucket 1510, at least one lane gate 1512 including at least one lane gate air cylinder 1514, at least one three-way pre-funnel 1516, at least one three-way swivel funnel 1518, at least one hopper divider 1520, at least one hopper cover 1522, at least one spreader sensor 1524, at least one weigh module 1526, at least one three-way funnel servo 1528, at least one reject funnel 1530, at least one accept funnel 1532, at least one memory bucket 1534, and at least one holding bucket 1536.

The hopper 1504 is configured to receive product manually from an operator or from an automated system. In the illustrated embodiment, the hopper 1504 is a container configured to hold the product until downstream equipment further processes the product. In the illustrated embodiment, the hopper 1504 may include a hopper divider 1520 that can separate the hopper 1504 into different regions. For example, the hopper 1504 may be divided into a large bud region 1538 and a small bud region 1540. Additionally, the hopper 1504 may also include a hopper cover 1522 configured to cover the hopper 1504 and protect the product. In the illustrated embodiment, an operator dumps the product into the hopper 1504 as shown in arrow 1802 of FIG. 18.

The at least one rear feeder 1506 and the at least one front feeder 1508 define the bottom of the hopper 1504 or are attached to a bottom of the hopper 1504. In the illustrated embodiment, the at least one rear feeder 1506 and the at least one front feeder 1508 define the bottom of the hopper 1504 and vibrate to transport product from a back of the hopper 1504 to a front of the hopper 1504. Specifically, the at least one rear feeder 1506 vibrates to transport the product to the at least one front feeder 1508 as shown in arrow 1804 of FIG. 18 and the at least one front feeder 1508 vibrates to transport the product to the at least one weigh bucket 1510 as shown in arrow 1806 of FIG. 18. In the illustrated embodiment, the upper, scale assembly 902 includes ten rear feeders 1506 and front feeders 1508. In alternative embodiments, the upper, scale assembly 902 includes any number of rear feeders 1506 and front feeders 1508 that enables the systems described herein to operate as described herein. Additionally, in the illustrated embodiment, the at least one front feeder 1508 vibrates faster than the at least one rear feeder 1506 to transport the buds quickly off the at least one front feeder 1508 while retaining the buds on the at least one rear feeder 1506 for a longer period of time. This enables the at least one front feeder 1508 to meter the buds going to the at least one weigh module 1526 to obtain accurate weights.

Figure 19:
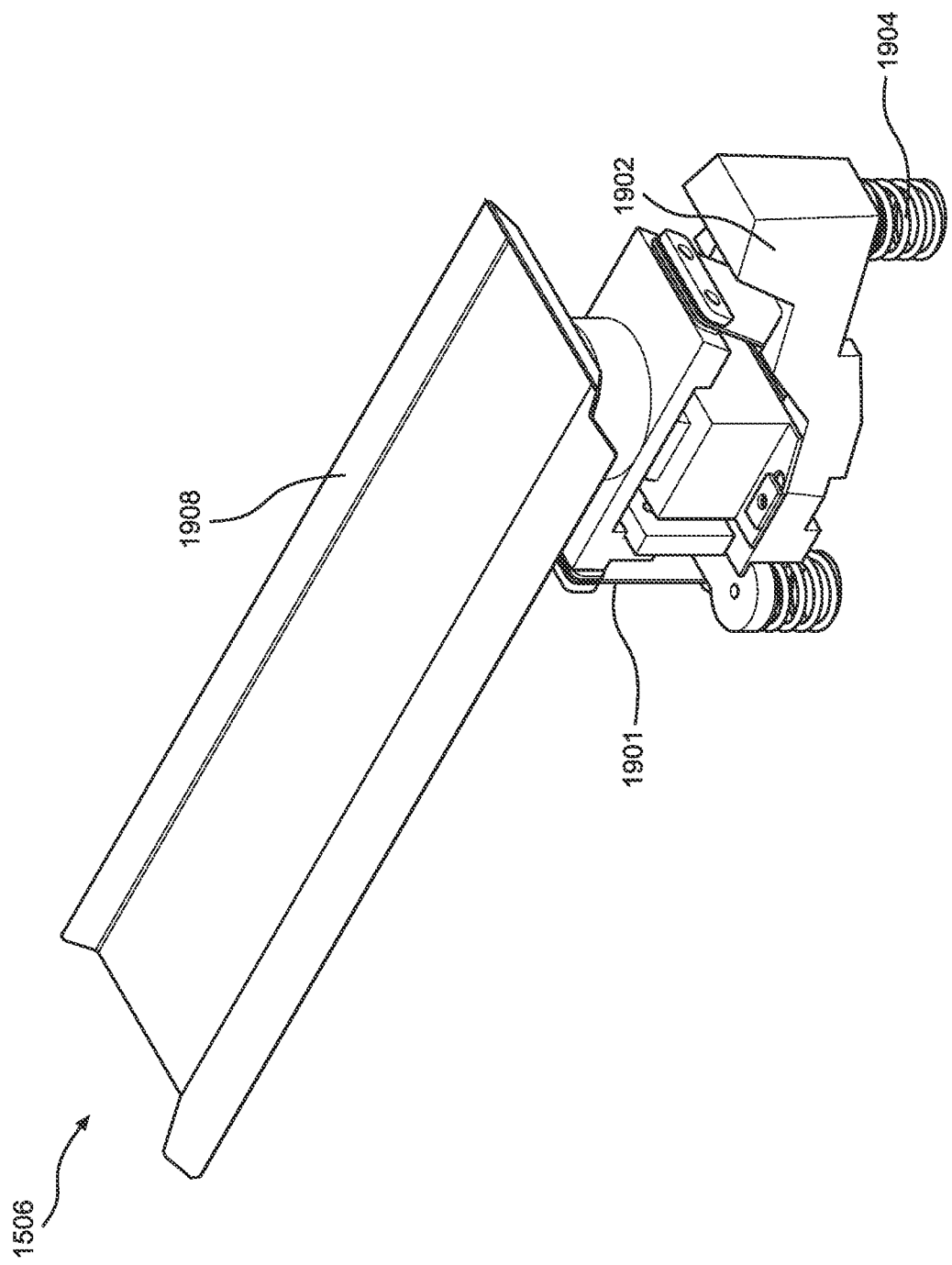
FIG. 19 illustrates a perspective view of the at least one rear feeder shown in FIG. 13.
Figure 20:
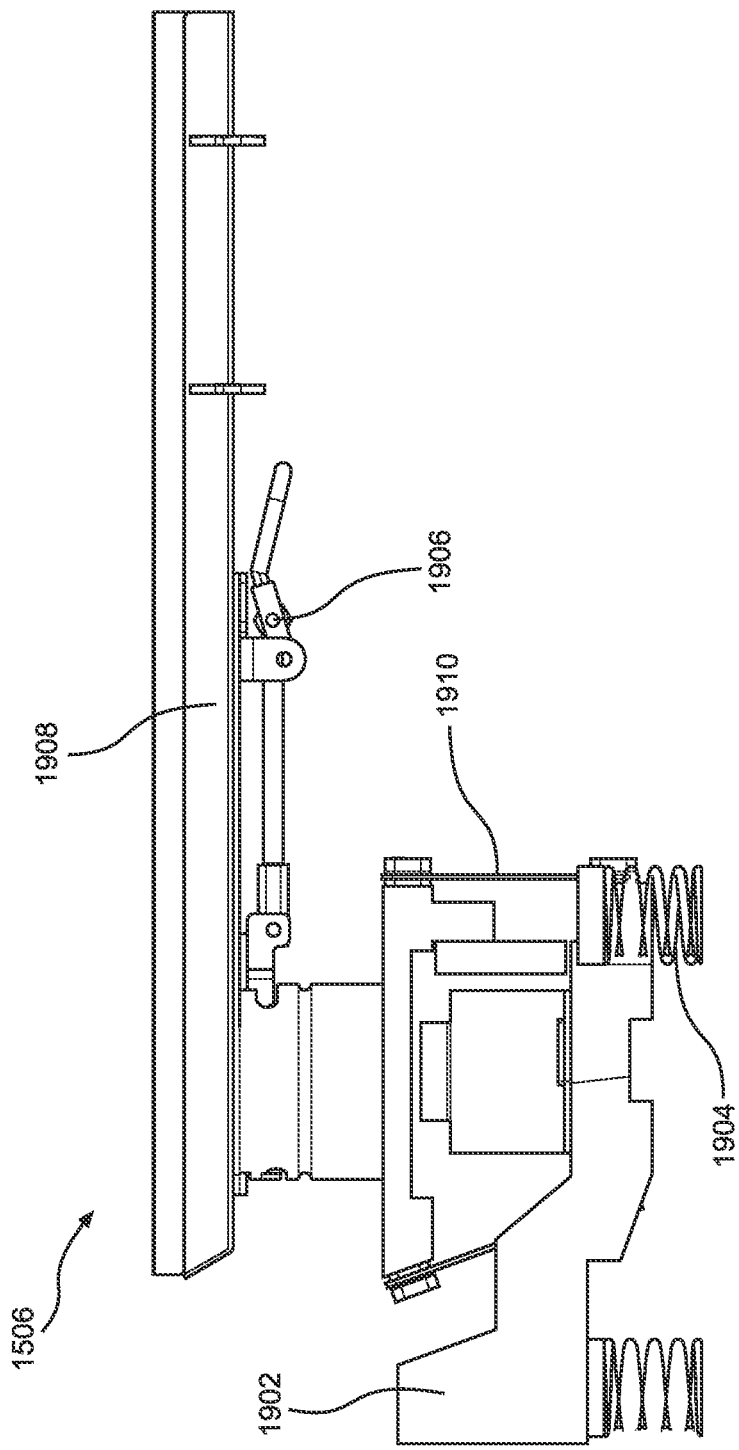
FIG. 20 illustrates a side view of the at least one rear feeder shown in FIG. 13.
Figure 21:
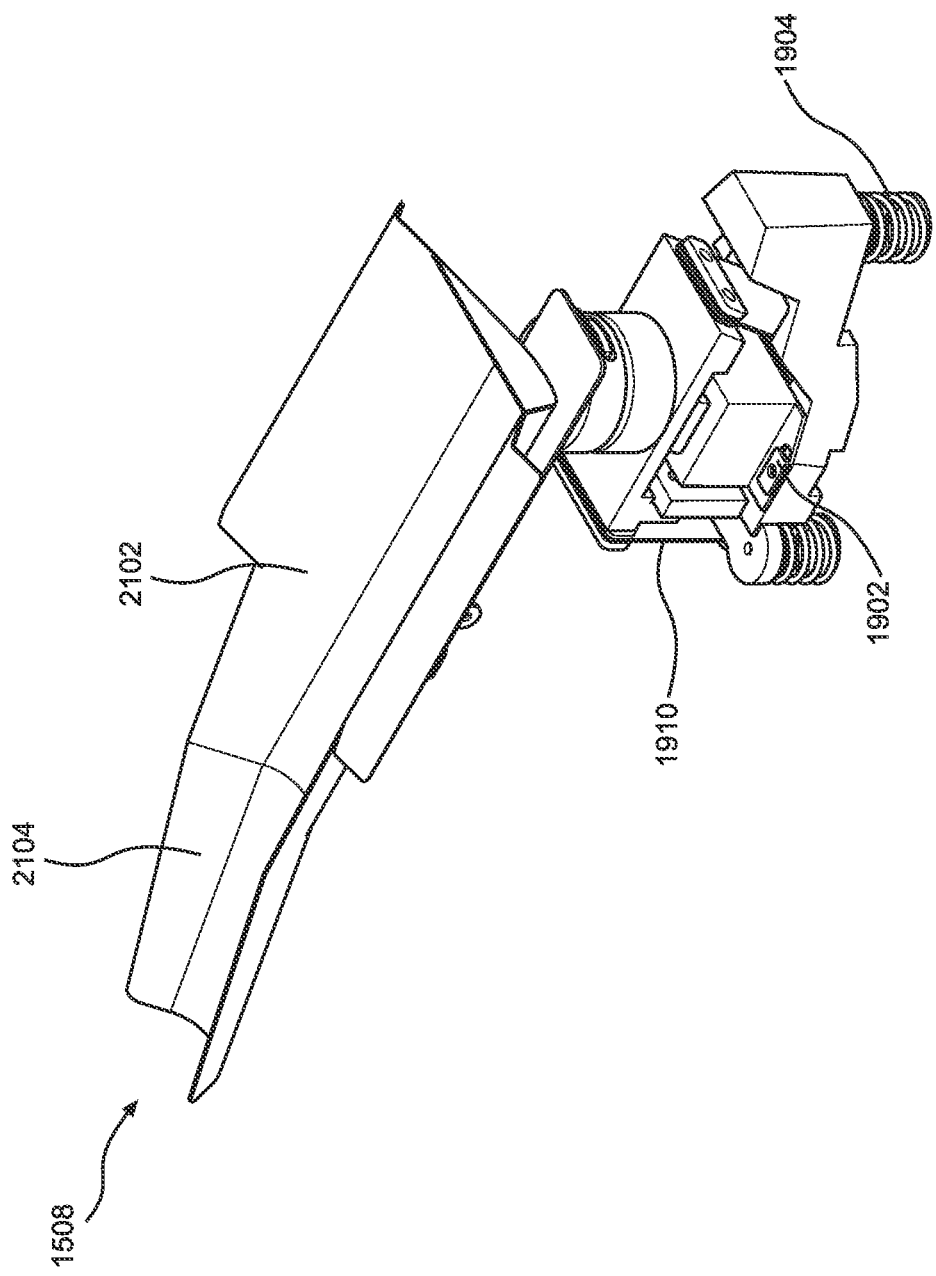
FIG. 21 illustrates a perspective view of the at least one front feeder shown in FIG. 13.
Figure 22:
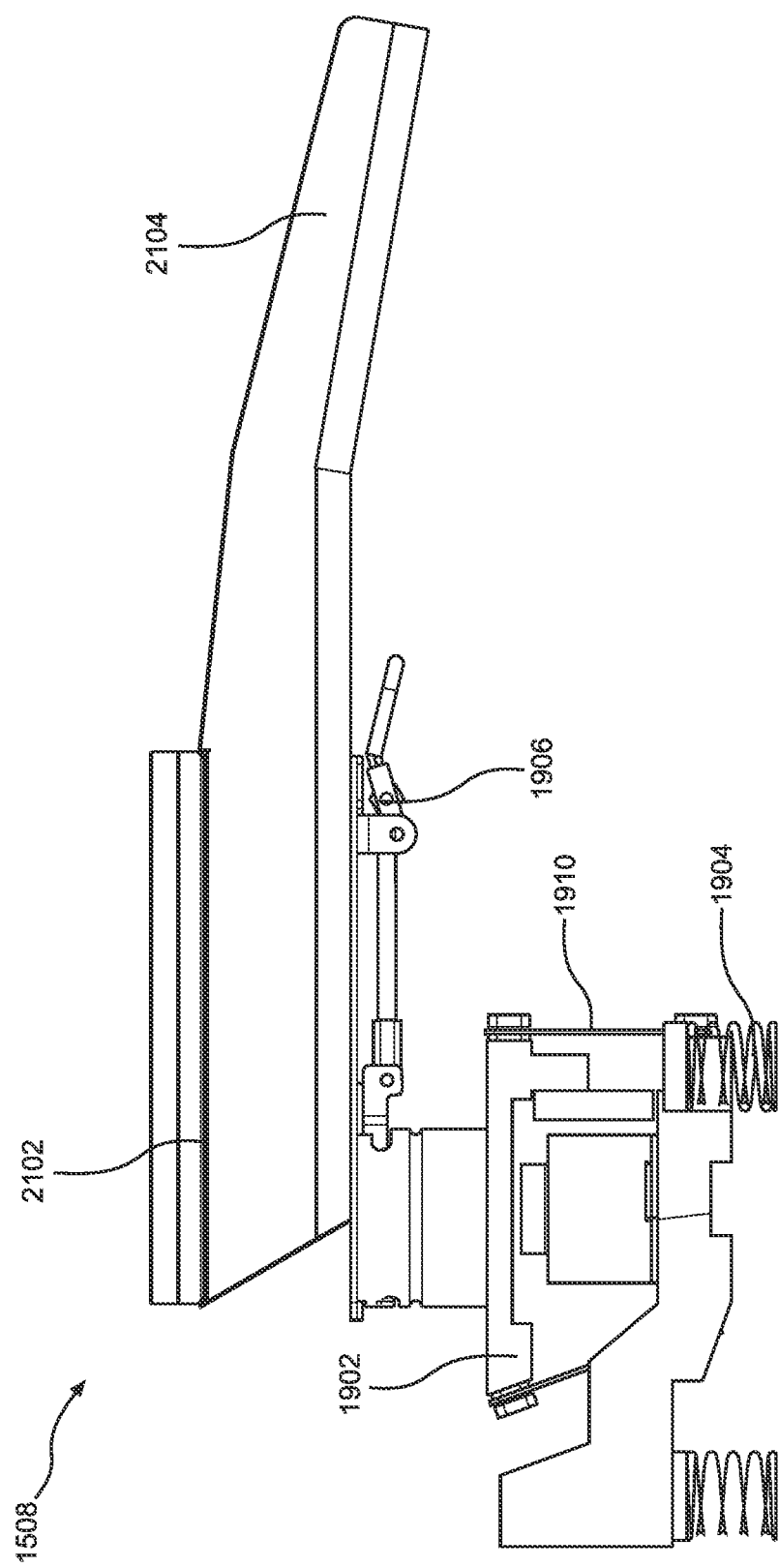
FIG. 22 illustrates a side view of the at least one front feeder shown in FIG. 13.

FIG. 19 illustrates a perspective view of the at least one rear feeder 1506. FIG. 20 illustrates a side view of the at least one rear feeder 1506. FIG. 21 illustrates a perspective view of the at least one front feeder 1508. FIG. 22 illustrates a side view of the at least one front feeder 1508. As shown in FIGS. 19-22, the at least one rear feeder 1506 and the at least one front feeder 1508 each include a vibratory feeder 1902, at least one spring foot 1904, a quick disconnect mechanism 1906, and a leaf spring 1910. The at least one spring foot 1904 attaches the vibratory feeder 1902 to the frame 1502. Additionally, the at least one rear feeder 1506 includes a rear feeder pan 1908 and the at least one front feeder 1508 includes a front feeder pan 2102. The quick disconnect mechanism 1906 attaches the rear feeder pan 1908 or the front feeder pan 2102 to the vibratory feeder 1902 and enables quick disconnection of the rear feeder pan 1908 or the front feeder pan 2102 from the vibratory feeder 1902 for cleaning. The rear feeder pan 1908 is shaped to transport the product to the front feeder pan 2102 and the front feeder pan 2102 has an angled spout 2104 such that the front feeder pan 2102 is shaped to transport the product to the at least one weigh bucket 1510. The leaf spring 1910 is provided for structural support while still enabling the rear feeder pan 1908 or the front feeder pan 2102 to vibrate. The leaf spring 1910 allows the feeder to supply consistent, uniform, vibration without the need for adjustment.

The at least one spreader sensor 1524 is configured to monitor the product in the hopper 1504. Specifically, the at least one spreader sensor 1524 includes a photo electric sensor that is configured to monitor the product in the hopper 1504. More specifically, the photo electric sensor is oriented toward the back of the front feeder pan 2102 to monitor the amount of product that is available for weighing. The spreader sensor controls the flow of the product from the hopper into the weigh bucket to allow for a consistent flow and achieve an accurate weight.

Figure 35:
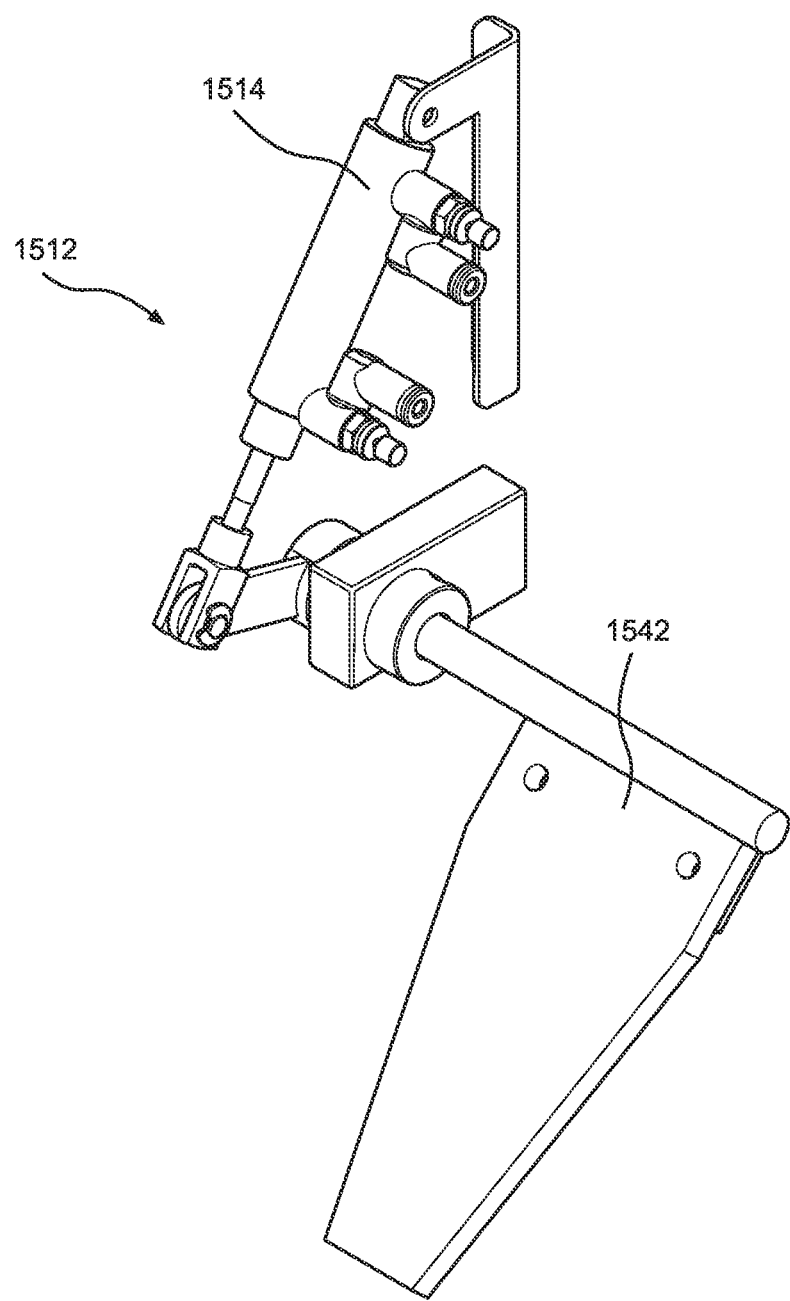
FIG. 35 illustrates a perspective view of the at least one lane gate shown in FIG. 13.
Figure 36:
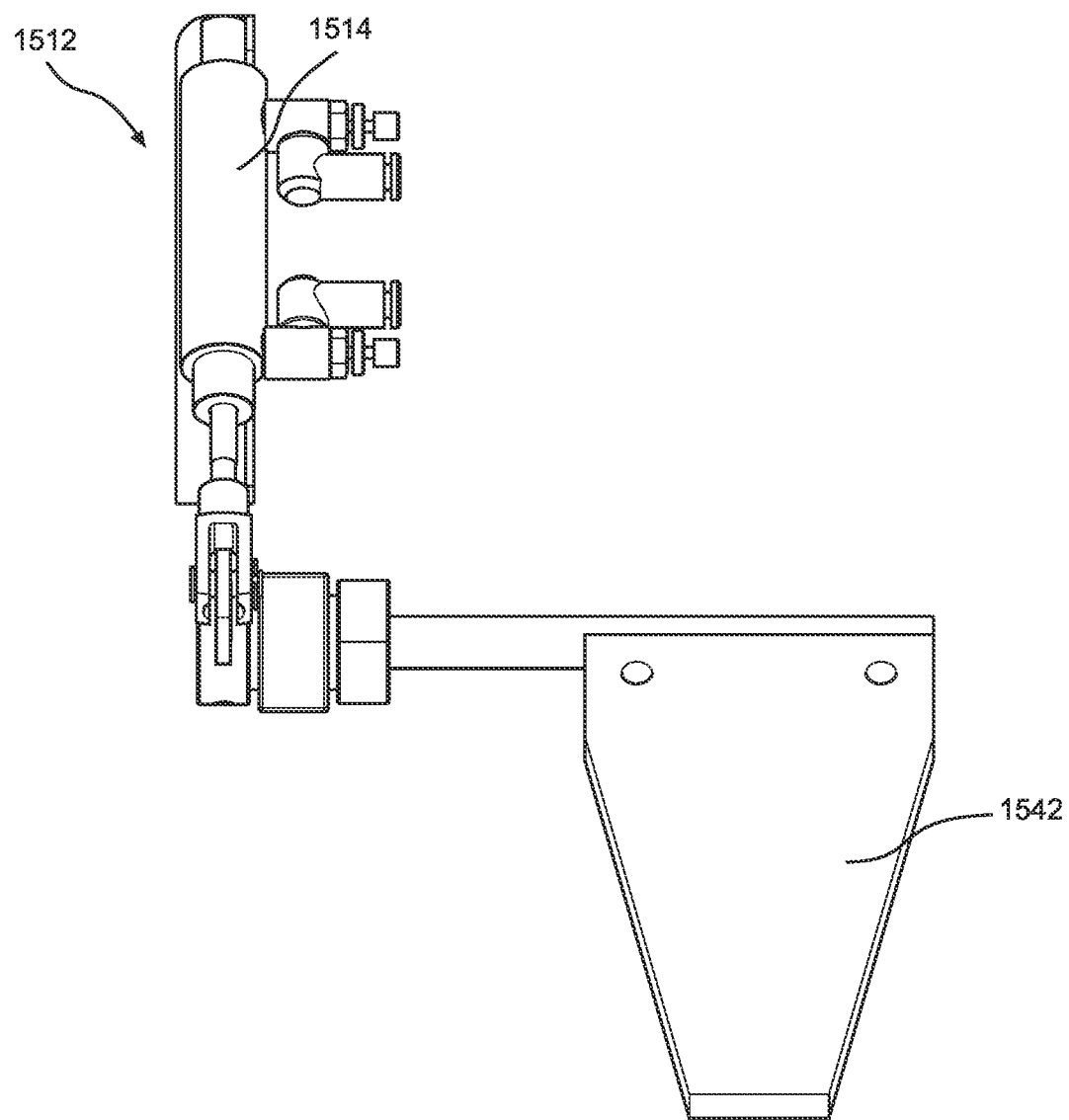
FIG. 36 illustrates a front view of the at least one lane gate shown in FIG. 13.
Figure 37:
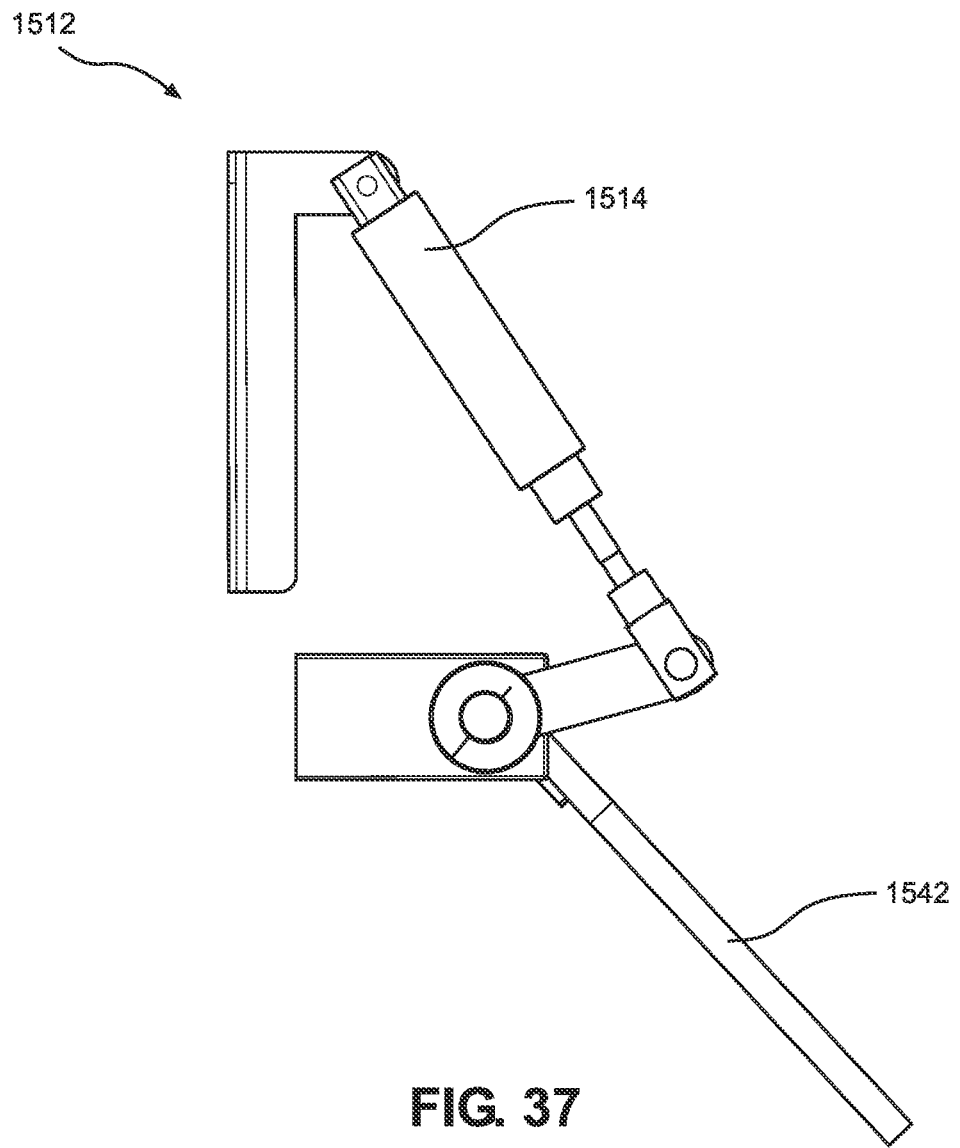
FIG. 37 illustrates a side view of the at least one lane gate shown in FIG. 13.

In the illustrated embodiment, the upper, scale assembly 902 includes ten lane gates 1512 correspond to the ten front feeders 1508. In alternative embodiments, the upper, scale assembly 902 includes any number of lane gates 1512 that enables the systems described herein to operate as described herein. The lane gates 1512 are configured to control the flow of product from the front feeders 1508 to the weigh buckets 1510. FIG. 35 illustrates a perspective view of the lane gates 1512. FIG. 36 illustrates a front view of the lane gates 1512. FIG. 37 illustrates a side view of the lane gates 1512. As shown in FIGS. 35-37, the lane gates 1512 each include a door 1542 operatively attached to the at least one lane gate air cylinder 1514. The at least one lane gate air cylinder 1514 is configured to open the door 1542 when the weigh buckets 1510 are prepared to receive product and close the door 1542 when the weigh buckets 1510 are full as shown in arrow 1808 of FIG. 18. The lane gates 1512 are controlled by a feedback loop based on the weight of the buds in the weigh bucket 1510. Specifically, the lane gates 1512 closes when the buds in the weigh buckets 1510 have a weight within the predetermined weight amount and opens when the weight is below the predetermined weight amount to enable buds to drop into the weight buckets 1510. Additionally, the feedback loop has a delay (500 milliseconds) to prevent spikes due to gravity from affecting the weight of the product in the weigh buckets 1510.

In the illustrated embodiment, the front feeders 1508 and the lane gates 1512 are configured to control the flow of the product such that the weight of the product within the weigh buckets 1510 is configured to be approximately one sixth to one third of the predetermined weight amount. More specifically, the front feeders 1508 are configured to vibrate at a specific frequency and the lane gates are configured to close when the buds in the weigh buckets 1510 have a weight within the predetermined weight amount such that the weight of the product within the weigh buckets 1510 is configured to be approximately one sixth to one third of the predetermined weight amount. Setting a target weight of the product within the weigh buckets 1510 to be a fraction of the predetermined weight amount enable a control system to combine the product in different weigh buckets 1510 and memory bucket 1534 such that the packaging system 104 accurately delivers product within the predetermined weight amount while minimizing waste.

Figure 23:
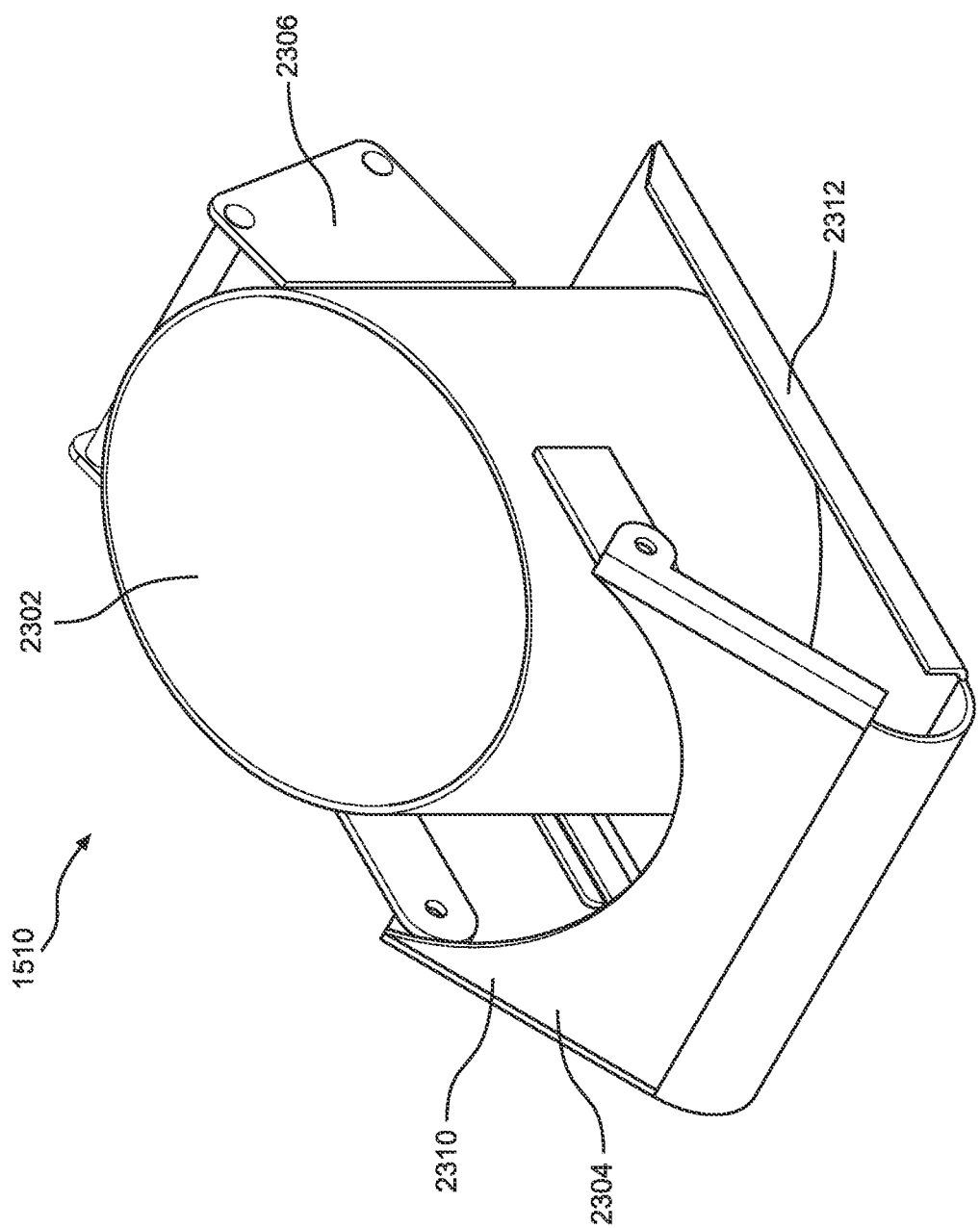
FIG. 23 illustrates a perspective view of the at least one weigh bucket shown in FIG. 13.
Figure 24:
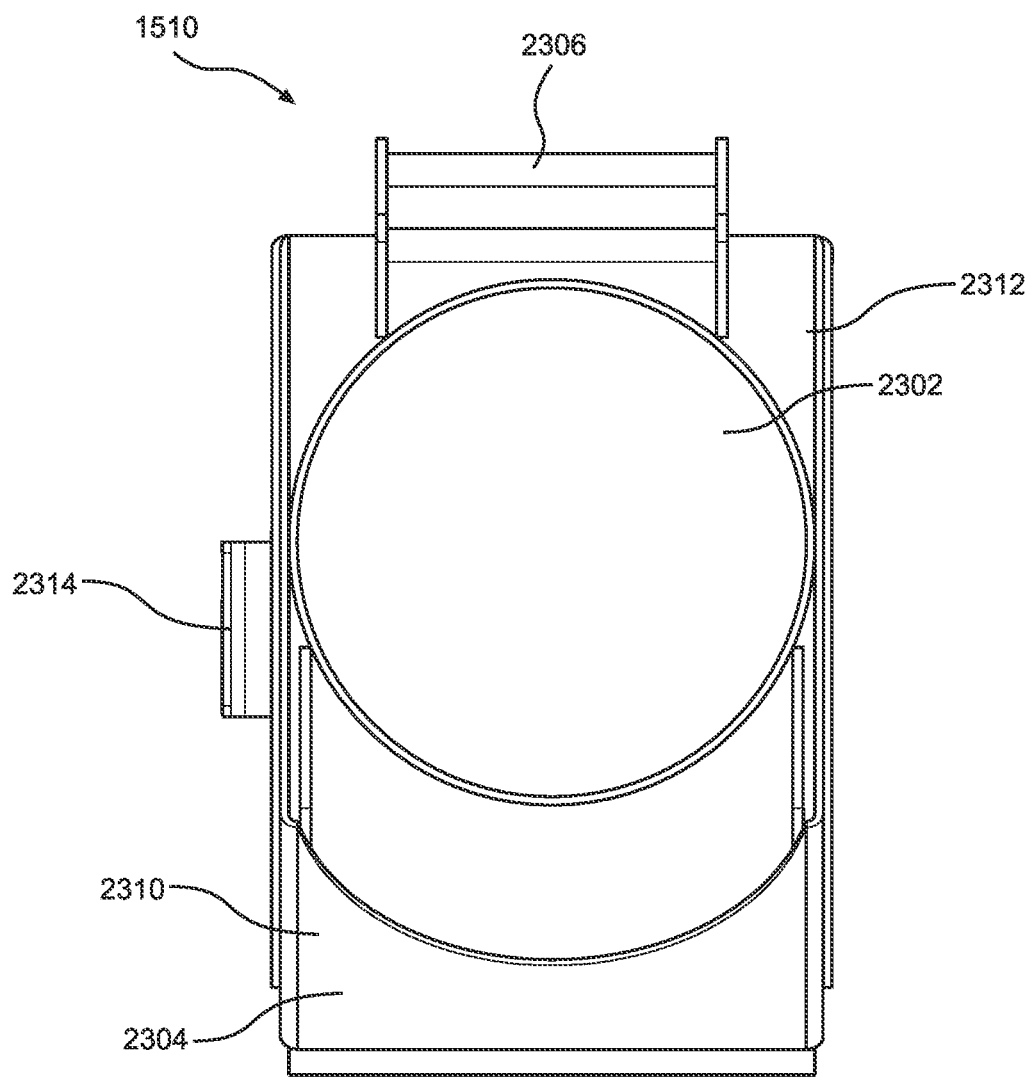
FIG. 24 illustrates a top view of the at least one weigh bucket shown in FIG. 13.
Figure 25:
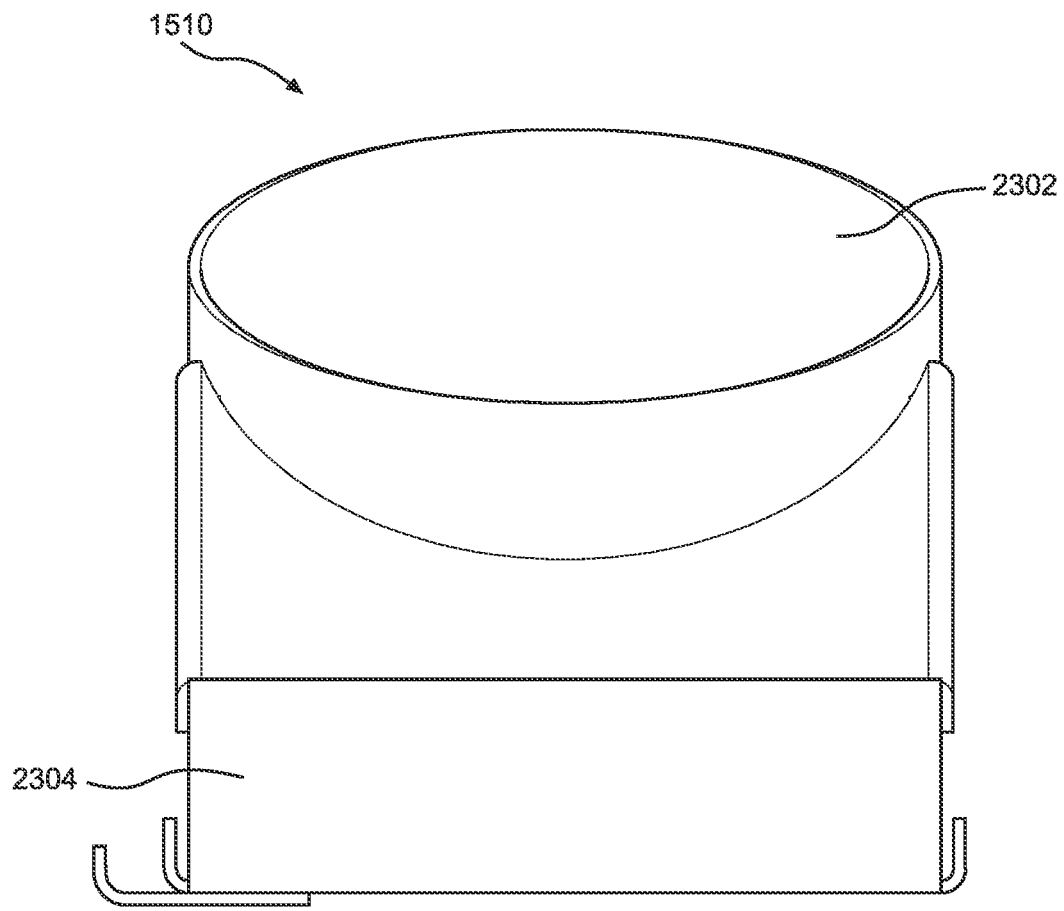
FIG. 25 illustrates a front view of the at least one weigh bucket shown in FIG. 13.
Figure 26:
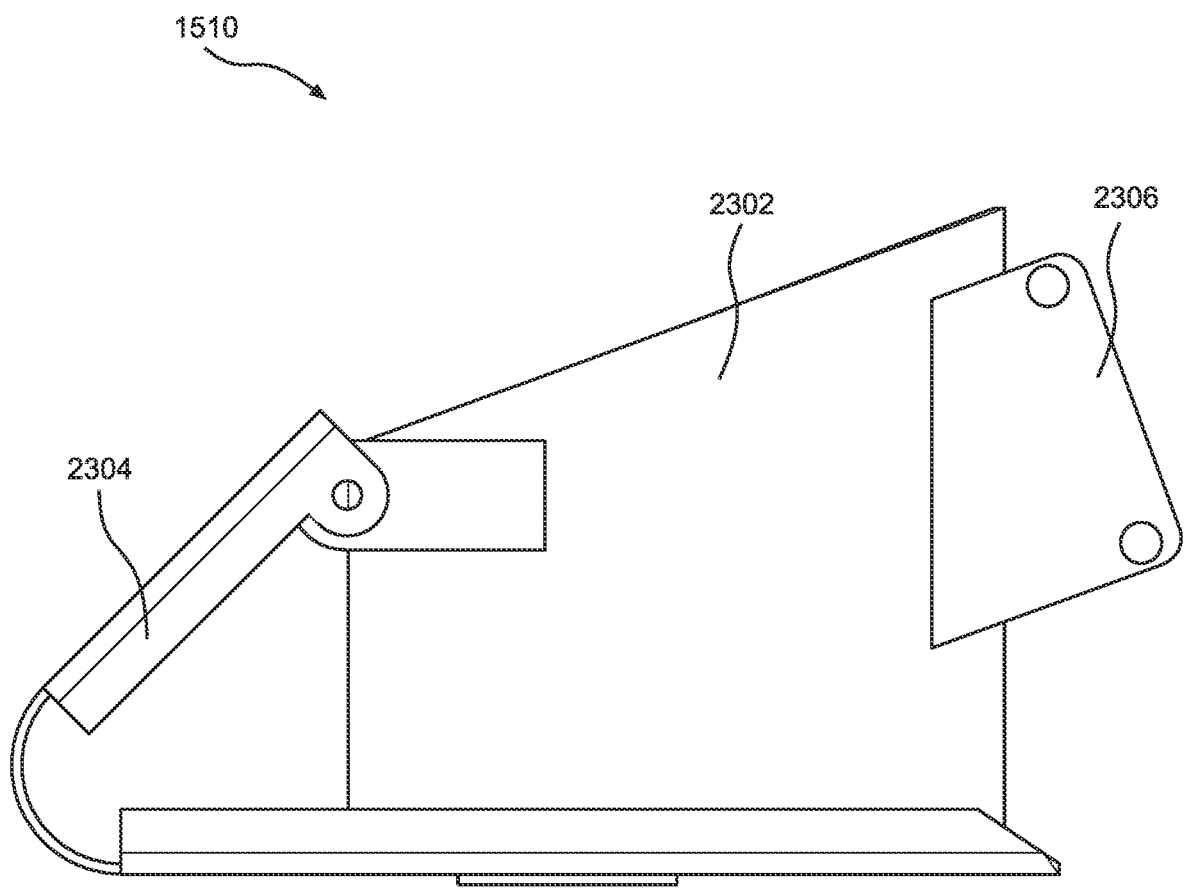
FIG. 26 illustrates a side view of the at least one weigh bucket shown in FIG. 13.
Figure 27:
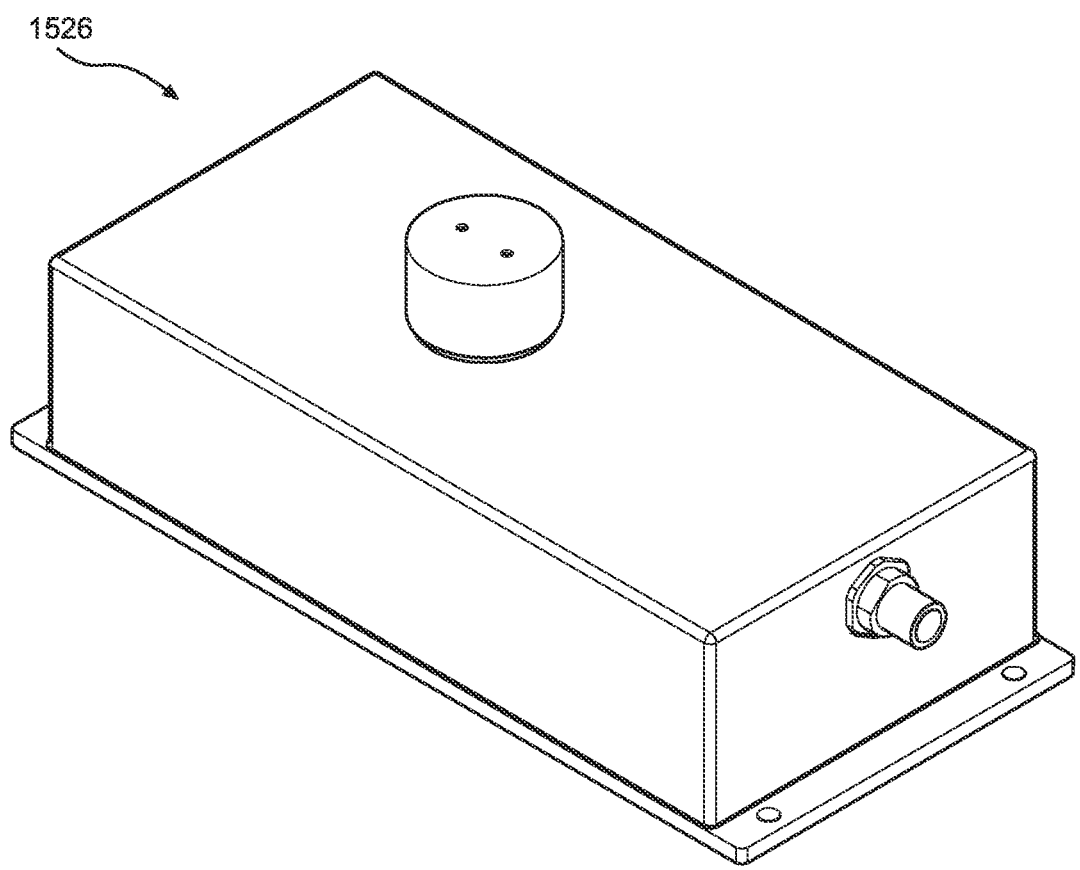
FIG. 27 illustrates a perspective view of the at least one weigh module shown in FIG. 13.
Figure 28:
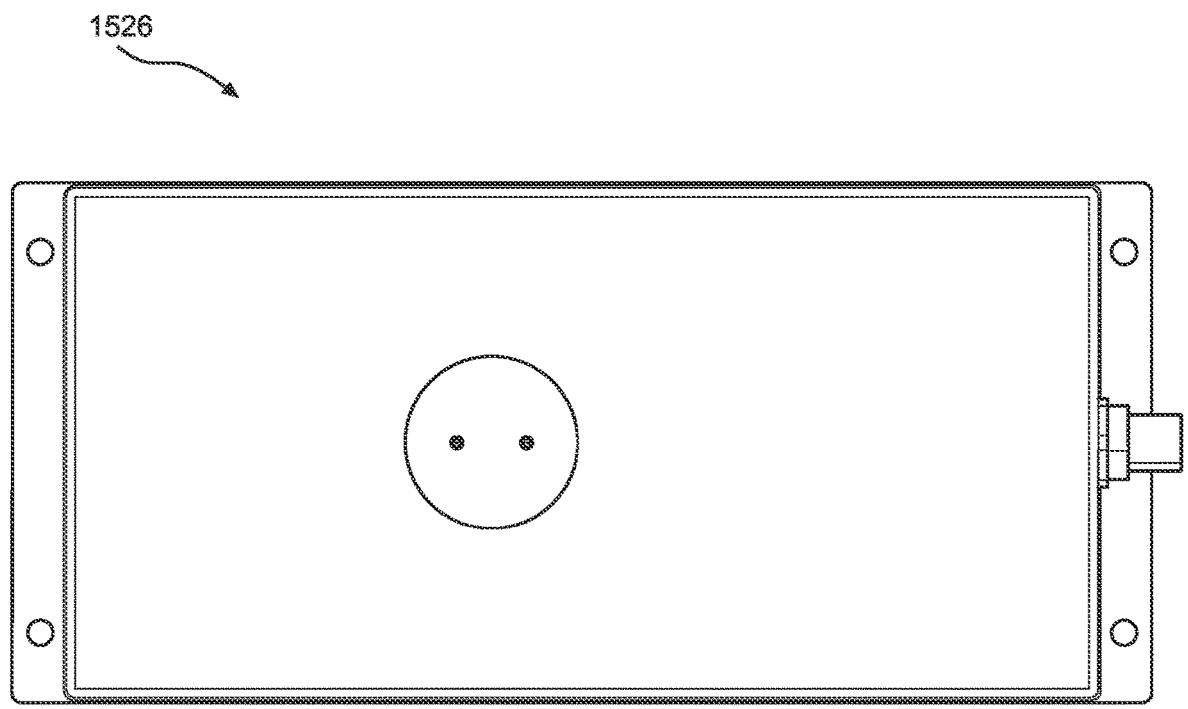
FIG. 28 illustrates a top view of the at least one weigh module shown in FIG. 13.
Figure 29:
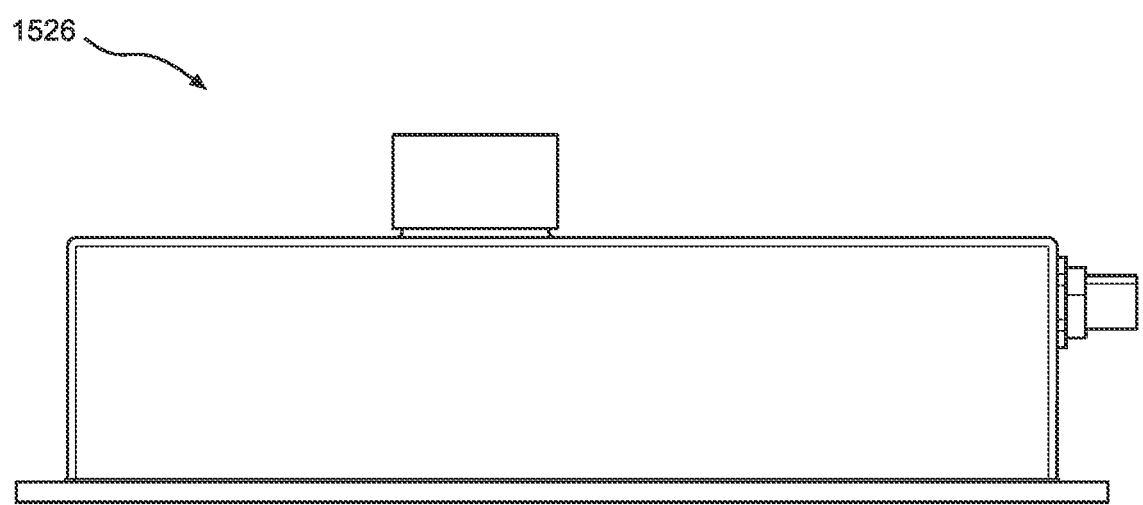
FIG. 29 illustrates a front view of the at least one weigh module shown in FIG. 13.
Figure 30:
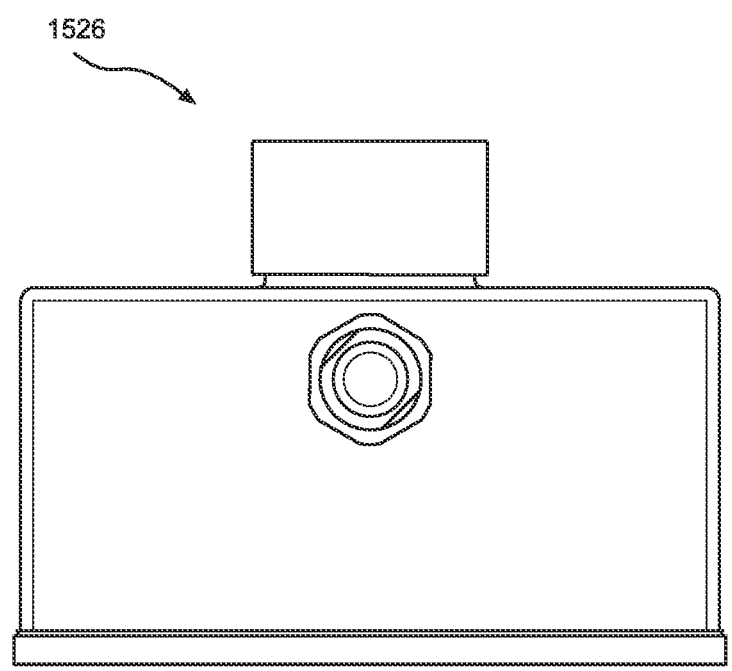
FIG. 30 illustrates a side view of the at least one weigh module shown in FIG. 13.

The weigh buckets 1510 are configured to receive the product from the front feeders 1508, accurately weigh the product, and transport the product into the at least one three-way pre-funnel 1516 as shown in arrow 1810 of FIG. 18. FIG. 23 illustrates a perspective view of the at least one weigh bucket 1510. FIG. 24 illustrates a top view of the at least one weigh bucket 1510. FIG. 25 illustrates a front view of the at least one weigh bucket 1510. FIG. 26 illustrates a side view of the at least one weigh bucket 1510. FIG. 27 illustrates a perspective view of the at least one weigh module 1526. FIG. 28 illustrates a top view of the at least one weigh module 1526. FIG. 29 illustrates a front view of the at least one weigh module 1526. FIG. 30 illustrates a side view of the at least one weigh module 1526.

As shown in FIGS. 23-30, the weigh bucket 1510 includes a receiving cylinder 2302, a door 2304, and a load cell mount 2306. The at least one weigh module 1526 is attached to the frame 1502 and attached to the load cell mount 2306. The load cell mount 2306 includes bars 2308 that enable quick connect and disconnect of the weigh module 1526 to and from the frame 1502. The receiving cylinder 2302 receives the product from the front feeders 1508 and the door 2304 and the receiving cylinder 2302 retain the product in the receiving cylinder 2302 while the weigh module 1526 accurately weighs the product in the weigh bucket 1510. Specifically, the weigh module 1526 weighs the weigh bucket 1510 and the product inside the weigh bucket 1510 and subtracts the weight of the weigh bucket 1510 from the combined weight of the weigh bucket 1510 and the product. The weigh module 1526 has one milligram resolution and is capable of achieving 1/100th of a gram accuracy. The door 2304 is configured to be self-closing. Specifically, the door 2304 includes a top portion 2310, a bottom portion 2312, and a servo strike plate 2314. A servo (not shown) is attached to the servo strike plate 2314 which is attached to the top portion 2310. The top portion 2310 is attached to the bottom portion 2312 which is configured to slide underneath the receiving cylinder 2302. The servo slides the servo strike plate 2314 and the top portion 2310 which, in turn, slide the bottom portion 2314 such that a bottom of the receiving cylinder 2302 is open and the product drops from the receiving cylinder 2302. The servo strike plate 2314 and the top portion 2310 are weighted such that the bottom portion 2314 remains in the closed position due to gravity unless the servo activates and opens the door 2304. The weigh bucket 1510 has a custom designed load cell mount 2306 that can be quickly connected to the module without the use of tools. The weight bucket 1510 is also designed to be lightweight and rigid.

Once the weigh module 1526 has accurately weighed the product in the weigh bucket 1510, a control system (not shown) compares the weights of the product in each of the weigh buckets 1510 and determines which combination of product in each weigh bucket 1510 adds up to a predetermined weight amount. For example, in some instances, only the product in a single weigh bucket 1510 adds up to the predetermined weight amount. In other instances, a combination of the product in multiple weigh buckets 1510 adds up to the predetermined weight amount. The control system then directs the weigh bucket 1510 to open the door 2304 to drop the product into the at least one three-way pre-funnel 1516 as shown in arrow 1810 of FIG. 18. The control system may direct multiple doors 2304 to open simultaneously such that the contents of multiple weigh buckets 1510 are simultaneously dropped into the three-way pre-funnels 1516 simultaneously for packaging in a single package.

Figure 31:
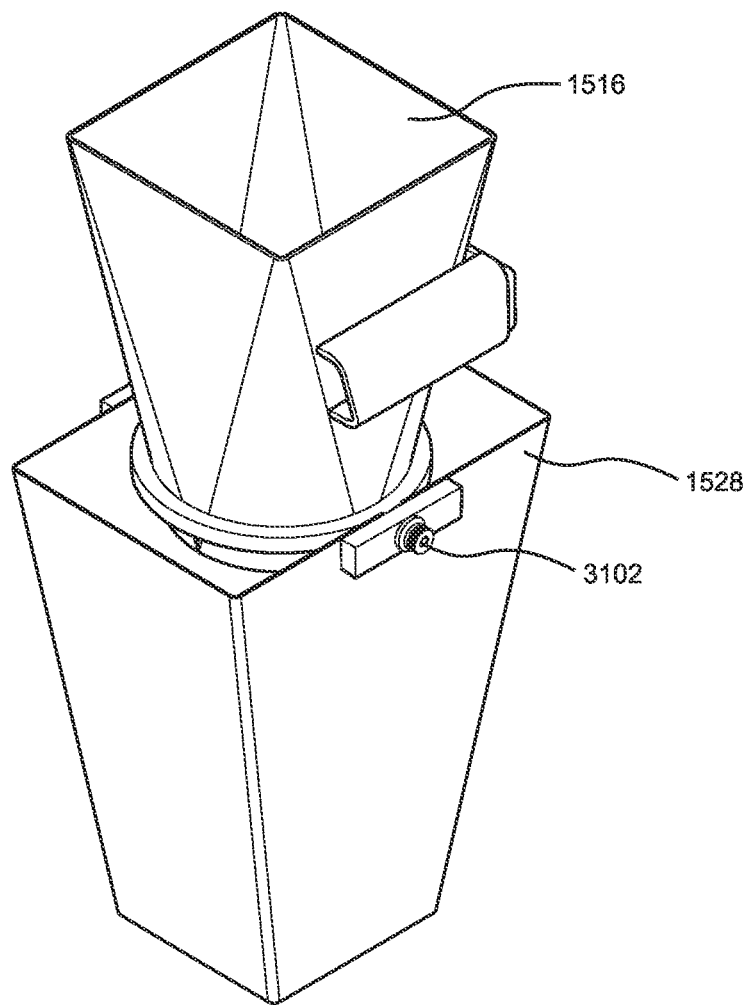
FIG. 31 illustrates a perspective view of the at least one three-way pre-funnel and the at least one three-way swivel funnel shown in FIG. 13.
Figure 32:
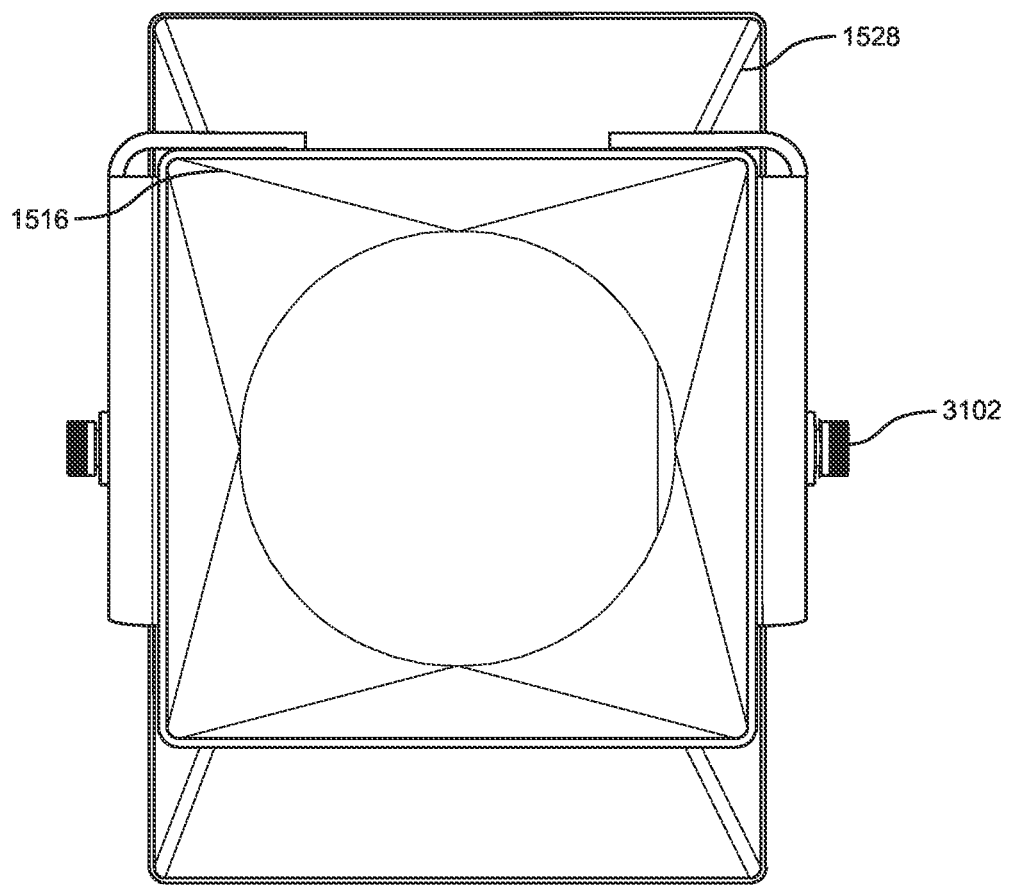
FIG. 32 illustrates a top view of the at least one three-way pre-funnel and the at least one three-way swivel funnel shown in FIG. 13.
Figure 33:
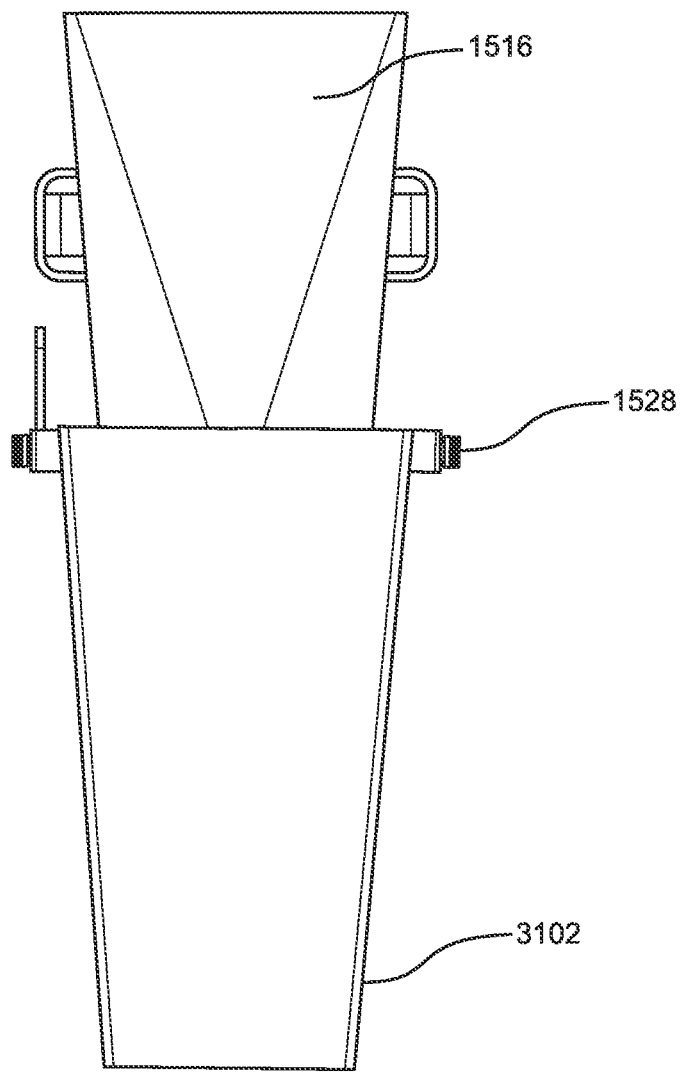
FIG. 33 illustrates a front view of the at least one three-way pre-funnel and the at least one three-way swivel funnel shown in FIG. 13.
Figure 34:
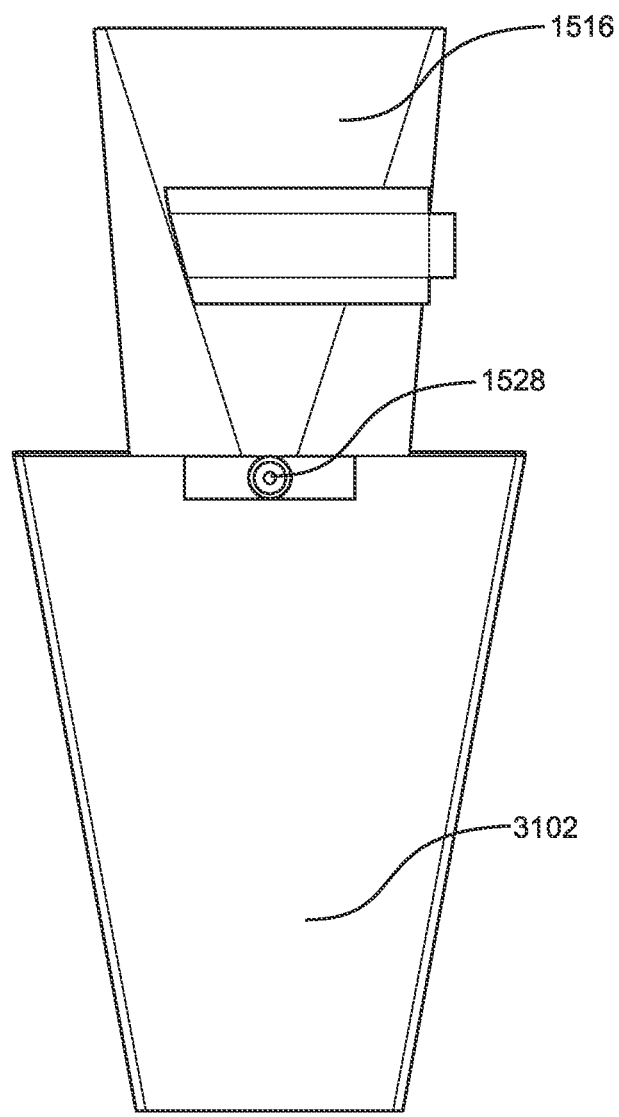
FIG. 34 illustrates a side view of the at least one three-way pre-funnel and the at least one three-way swivel funnel shown in FIG. 13.

FIG. 31 illustrates a perspective view of the at least one three-way pre-funnel 1516 and the at least one three-way swivel funnel 1518. FIG. 32 illustrates a top view of the at least one three-way pre-funnel 1516 and the at least one three-way swivel funnel 1518. FIG. 33 illustrates a front view of the at least one three-way pre-funnel 1516 and the at least one three-way swivel funnel 1518. FIG. 34 illustrates a side view of the at least one three-way pre-funnel 1516 and the at least one three-way swivel funnel 1518. As shown in FIGS. 31-34, the at least one three-way pre-funnel 1516 is attached to the frame 1502 and remains stationary. The at least one three-way pre-funnel 1516 is configured to channel product from the weigh bucket 1510 to the at least one three-way swivel funnel 1518 as shown by arrow 1812 of FIG. 18. The at least one three-way swivel funnel 1518 is pivotably attached to the at least one three-way pre-funnel 1516 at a pivot point 3102 and is attached to the at least one three-way funnel servo 1528.

The at least one three-way funnel servo 1528 controls the at least one three-way swivel funnel 1518 such that the product is directed to the appropriate equipment for further processing. Specifically, the at least one three-way funnel servo 1528 controls the at least one three-way swivel funnel 1518 to direct the product to at least one of the reject funnel 1530, the accept funnel 1532, the memory bucket 1534, and the holding bucket 1536 as shown by arrows 1814 of FIG. 18. In some embodiments, the holding bucket 1536 may be another container or piece of equipment.

The three-way swivel funnel 1518 directs the product into the reject funnel 1530, the accept funnel 1532, the memory bucket 1534, and the holding bucket 1536. Product that is out of tolerance or does not fall within the predetermined weight amount and/or other standards are rejected into the rejected funnel 1532 as shown by arrows 1814 of FIG. 18. Product that meets predetermined weight requirements is dropped from the weigh bucket 1510 down into the memory bucket 1534 as shown by arrow 1818 of FIG. 18 or are directed from the three-way swivel funnel 1518 down through the accept funnel 1532 into the holding bucket 1536 as shown by arrow 1820 of FIG. 18. Additionally, product that meets predetermined weight requirements is dropped from the memory bucket 1534 down into the holding bucket 1536 as shown by arrow 1822 of FIG. 18. The holding bucket 1536 receives the combination of product in a central location and drops the product into other equipment or directly into a package for further processing.

In the illustrated embodiment, the packaging system 104 includes ten memory buckets 1534 and ten weigh buckets 1510. Each memory bucket 1534 and each weigh bucket 1510 has product within that has a weight that is configured to be approximately one sixth to one third of the predetermined weight amount. The control system then calculates which combination of product within the memory buckets 1534 and the weigh buckets 1510 may be combined to achieve a weight that is within the predetermined weight amount. Because the packaging system 104 includes ten memory buckets 1534 and ten weigh buckets 1510, the control system has many combinations to choose from and, as such, the control system controls the weight of the product delivered to the packaging to a high degree of accuracy.

Additionally, as described above, the hopper 1504 may be divided into a large bud region 1538 and a small bud region 1540. The control system may be configured to combine the product in the memory buckets 1534 and the weigh buckets 1510 to ensure that each packaging includes at least one large bud from the large bud region 1538. As such, the packaging system 104 describe herein packages product in a container within a predetermined weight amount that includes at least one large bud or a plurality of large buds depending on the size of the packaging.

The rear feeders 1506, the front feeders 1508, the weigh buckets 1510, the lane gates 1512, the three-way pre-funnels 1516, and the three-way swivel funnels 1518 define at least one product lanes 1544. Product is configured to be transported from the hopper 1504 to the reject funnel 1530, the accept funnel 1532, the memory bucket 1534, and the holding bucket 1536 via the product lanes 1544. As describe above, the upper, scale assembly 902 includes ten rear feeders 1506, front feeders 1508, weigh buckets 1510, lane gates 1512, three-way pre-funnels 1516, and three-way swivel funnels 1518 such that the upper, scale assembly 902 includes ten product lanes 1544. Each product lane 1544 transports product from the hopper 1504 to the reject funnel 1530, the accept funnel 1532, the memory bucket 1534, and the holding bucket 1536 by vibrating the rear feeders 1506 and the front feeders 1508 and operating the weigh buckets 1510, the lane gates 1512, the three-way pre-funnels 1516, and the three-way swivel funnels 1518 as described above. Generally, the product remains in the product lane 1544 as it is transported from the hopper 1504 to the reject funnel 1530, the accept funnel 1532, the memory bucket 1534, and the holding bucket 1536.

In the illustrated embodiment, the hopper divider 1520 is positioned in the hopper 1504 to define the large bud region 1538 and the small bud region 1540 such that the large bud region 1538 includes three product lanes 1544 and the small bud region 1540 includes seven product lanes 1544. In alternative embodiments, the large bud region 1538 and the small bud region 1540 may include any number of product lanes 1544 that enables the upper, scale assembly 902 to operate as described herein. As described above, the product from each product lane 1544 can be combined with product from the other product lanes 1544 such that the product in the holding bucket 1536 has a weight within the predetermined weight amount. Thus, the product lanes 1544 divide the input product into sortable streams that enable the upper, scale assembly 902 to deliver an accurately weighed amount of product that is within a set tolerance into the holding bucket 1536. Product from product lanes 1544 within the large bud region 1538 is combined with product from product lanes 1544 within the small bud region 1540 such that the packaging includes both large buds and small buds that is within a set tolerance.

Accordingly, the packaging system 104 described herein is configured to receive the product from the descrambling system 102, accurately weigh the product, and transport the accurately weighed product to additional equipment for further processing or to packaging. In the illustrated embodiment, the product includes cannabis buds and the packaging system 104 weighs each bud and selects an appropriate combination of buds for each packaging such that a weight of the packaging is within a predetermined weight amount. The packaging system 104 then delivers the selected buds to the additional equipment for further processing. As such, the packaging system 104 described herein automatically delivers an accurately weighed amount of product that is within a set tolerance for packaging and retail sale, simplifying the packaging process, reducing costs, reducing errors, and increasing profits.

Figure 38:
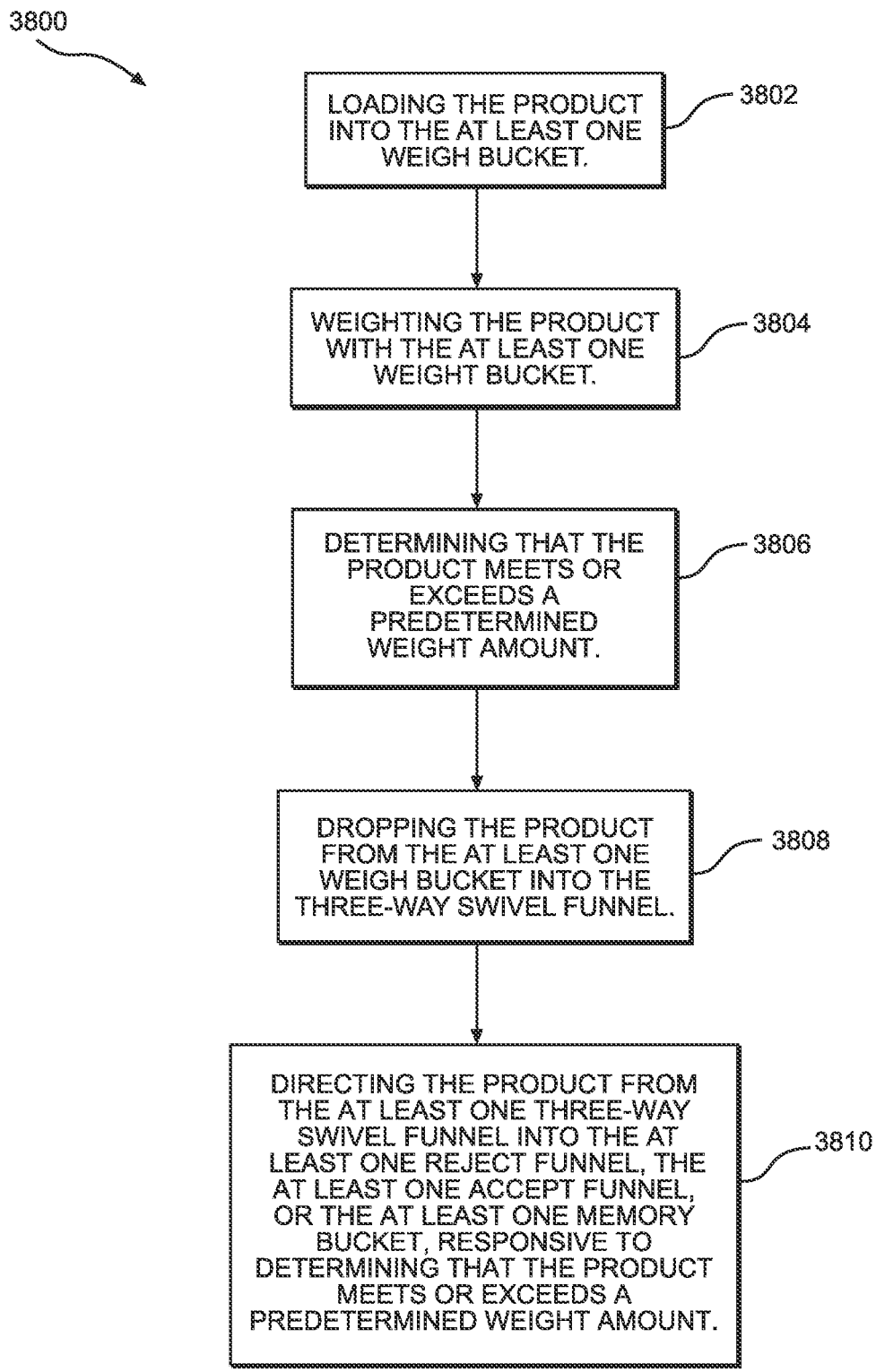
FIG. 38 is a flow diagram of a method of packaging a product using a packaging system.

FIG. 38 is a flow diagram of a method 3800 of packaging a product using a packaging system. The packaging system includes at least one weigh bucket, at least one three-way swivel funnel, at least one reject funnel, at least one accept funnel, and at least one memory bucket. In some embodiments, the packaging system also includes at least one holding bucket (or container or other equipment). The method 3800 includes loading 3802 the product into the packaging system. In some embodiments, the product is loaded into a hopper and moved to at least one weigh bucket. The method 3800 also includes weighing 3804 the product with the at least one weigh bucket. The method 3800 further includes determining 3806 that the product meets or exceeds a predetermined weight amount. The method 3800 also includes dropping 3808 the product from the at least one weigh bucket into the three-way swivel funnel. The method 3800 further includes directing 3810 the product from the at least one three-way swivel funnel into the at least one reject funnel, the at least one accept funnel, or the at least one memory bucket, responsive to determining that the product meets or exceeds a predetermined weight amount.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural.

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

What is claimed:

1. A method of packaging a product using a packaging system, the packaging system includes at least one weigh bucket, at least one three-way swivel funnel, at least one reject funnel, at least one accept funnel, a hopper, a hopper divider, at least one rear feeder, at least one front feeder, at least one lane gate, at least one three-way pre-funnel, and at least one memory bucket, the method includes:
dividing the hopper, with the hopper divider, into a large bud region including three product lanes and a small bud region including seven product lanes, the large bud region configured to contain large buds of the product and the small bud region configured to contain small buds of the product;

transporting the product forward from the hopper to the at least one reject funnel, the at least one accept funnel, or the at least one memory bucket using the product lane, wherein transporting the product forward from the hopper to the at least one reject funnel, the at least one accept funnel, or the at least one memory bucket includes:

loading the product into the hopper;

transporting the product forward from the at least one rear feeder to the at least one front feeder;

dropping the product from the at least one front feeder into the at least one weigh bucket;

shutting the at least one lane gate to stop dropping the product from the at least one front feeder into the at least one weigh bucket once a weight of the product in the at least one weigh bucket is within the predetermined weight amount;

weighing the product in the at least one weigh bucket;

determining that the product meets or exceeds a predetermined weight amount;

dropping the product from the at least one weigh bucket into the three-way swivel funnel;

dropping the product into the three-way pre-funnel from the at least one weigh bucket; and directing the product from the at least one three-way swivel funnel into the at least one reject funnel, the at least one accept funnel, or the at least one memory bucket, responsive to determining that the product meets or exceeds a predetermined weight amount; and combining product from at least one of the three product lanes in the large bud region with product from at least one of the seven product lanes in the small bud region in a packaging, wherein the at least one rear feeder, the at least one front feeder, the at least one weigh bucket, the at least one lane gate, and the at least one three-way pre-funnel define at least one product lane.

2. The method of claim 1, further comprising:

weighing the product with the at least one weigh bucket at a product weight that meets the predetermined weight amount; and directing the product from the at least one three-way swivel funnel into the at least one accept funnel and into at least one holding bucket responsive to the product weight meeting the predetermined weight amount.

3. The method of claim 1, further comprising:

weighing the product with the at least one weigh bucket at a product weight that exceeds the predetermined weight amount; and directing the product from the at least one three-way swivel funnel down into the at least one rejected funnel responsive to the product weight exceeding the predetermined weight amount.

4. The method of claim 1, further comprising:

weighing the product with the at least one weigh bucket at a product weight that meets the predetermined weight amount;

directing the product from the at least one three-way swivel funnel into the at least one memory bucket responsive to the product weight meeting the predetermined weight amount.

5. The method of claim 4, further comprising dropping the product from the at least one memory bucket into at least one holding bucket.

6. The method of claim 5, further comprising receiving in the at least one holding bucket a combination of the product in a central location and dropping the combination of the product into other equipment or directly into the package.

7. The method of claim 1, wherein directing the product from the at least one three-way swivel funnel into the at least one reject funnel, the at least one accept funnel, or the at least one memory bucket, responsive to determining that the product meets or exceeds a predetermined weight amount comprises directing at least one large bud and at least one small bud into the at least one accept funnel and into at least one holding bucket, responsive to determining that the product meets the predetermined weight amount.

* * * * *